(12) United States Patent
Yoo et al.

(10) Patent No.: US 12,177,485 B2
(45) Date of Patent: Dec. 24, 2024

(54) IMAGE OR VIDEO CODING BASED ON ESCAPE BINARIZATION IN PALETTE MODE

(71) Applicant: LG ELECTRONICS INC., Seoul (KR)

(72) Inventors: Sunmi Yoo, Seoul (KR); Junghak Nam, Seoul (KR); Seunghwan Kim, Seoul (KR); Jie Zhao, Seoul (KR)

(73) Assignee: LG ELECTRONIC, INC., Seoul (KR)

( * ) Notice: Subject to any disclaimer, the term of this patent is extended or adjusted under 35 U.S.C. 154(b) by 348 days.

(21) Appl. No.: 17/639,129

(22) PCT Filed: Aug. 31, 2020

(86) PCT No.: PCT/KR2020/011618
§ 371 (c)(1),
(2) Date: Feb. 28, 2022

(87) PCT Pub. No.: WO2021/040488
PCT Pub. Date: Mar. 4, 2021

(65) Prior Publication Data
US 2022/0295105 A1      Sep. 15, 2022

Related U.S. Application Data

(60) Provisional application No. 62/893,780, filed on Aug. 29, 2019.

(51) Int. Cl.
*H04N 19/176* (2014.01)
*H04N 19/132* (2014.01)
*H04N 19/186* (2014.01)
*H04N 19/70* (2014.01)

(52) U.S. Cl.
CPC ........... *H04N 19/70* (2014.11); *H04N 19/132* (2014.11); *H04N 19/176* (2014.11); *H04N 19/186* (2014.11)

(58) Field of Classification Search
None
See application file for complete search history.

(56) References Cited

U.S. PATENT DOCUMENTS

| | | | |
|---|---|---|---|
| 11,943,481 B2 * | 3/2024 | Zhu | H04N 19/91 |
| 2016/0227247 A1 * | 8/2016 | Zou | H04N 19/44 |
| 2018/0288415 A1 * | 10/2018 | Li | H04N 19/157 |
| 2024/0080437 A1 * | 3/2024 | Zhou | H04N 19/136 |

FOREIGN PATENT DOCUMENTS

| | | |
|---|---|---|
| KR | 1020160093061 | 8/2016 |
| KR | 1020160135262 | 11/2016 |
| KR | 1020180056687 | 5/2018 |
| KR | 101958534 | 3/2019 |
| KR | 101977450 | 5/2019 |

* cited by examiner

*Primary Examiner* — Sath V Perungavoor
*Assistant Examiner* — Paramita Ghosh
(74) *Attorney, Agent, or Firm* — Bryan Cave Leighton Paisner LLP

(57) ABSTRACT

According to the disclosure of the present document, an escape value may be effectively binarized on the basis of a maximum value of an escape value, which may be inferred by a quantization parameter in a palette mode. Accordingly, in a palette mode, the length of a bin may be adjusted or the number bits may be saved, according to a maximum value of an escape value, whereby coding efficiency may be improved.

15 Claims, 14 Drawing Sheets

FIG. 10 horizontal traverse scan (a)

vertical traverse scan (b)

IMAGE OR VIDEO CODING BASED ON ESCAPE BINARIZATION IN PALETTE MODE

This application is the National Stage filing under 35 U.S.C. 371 of International Application No. PCT/KR2020/011618 filed on Aug. 31, 2020, which claims priority to U.S. Provisional Application No. 62/893,780 filed on Aug. 29, 2019, the contents of which are all hereby incorporated by reference herein in their entirety.

BACKGROUND OF THE DISCLOSURE

Field of the Disclosure

The present disclosure relates to video or image coding, for example, to escape binarization-based image or video coding techniques in palette mode.

Related Art

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

There is also a discussion of palette mode coding technology to improve coding efficiency for screen content, such as computer generated video including significant amounts of text and graphics. In order to effectively apply this technique, a method for binarizing related information is required.

SUMMARY

The present disclosure provides a method and apparatus for increasing video/image coding efficiency.

The present disclosure also provides a method and apparatus for increasing efficiency in palette mode coding.

The present disclosure also provides a method and apparatus for efficiently applying escape coding in a palette mode.

The present disclosure also provides a method and apparatus for binarizing an escape value based on a maximum value of the escape value that may be inferred by a quantization parameter in a palette mode.

In an aspect, a maximum value of a quantized escape value may be derived based on a quantization parameter for a quantized escape value of a palette mode, and a binarization process may be performed on the quantized escape value based on the maximum value. For example, truncated binary (TB) binarization may be performed on the quantized escape value based on the maximum value. Alternatively, for example, fixed length (FL) binarization may be performed on the quantized escape value based on the maximum value. Alternatively, for example, k-th order Exp-Golomb (EG) binarization may be performed on the quantized escape value.

According to an embodiment of the present disclosure, a video/image decoding method performed by a decoding apparatus is provided. The video/image decoding method may include a method disclosed in the embodiments of the present disclosure.

According to an embodiment of the present disclosure, a decoding apparatus for performing video/image decoding is provided. The decoding apparatus may perform a method disclosed in the embodiments of the present disclosure.

According to an embodiment of the present disclosure, a video/image encoding method performed by an encoding apparatus is provided. The video/image encoding method may include a method disclosed in the embodiments of the present disclosure.

According to an embodiment of the present disclosure, an encoding apparatus for performing video/image encoding is provided. The encoding apparatus may perform a method disclosed in the embodiments of the present disclosure.

According to an embodiment of the present disclosure, there is provided a computer-readable digital storage medium in which encoded video/image information generated according to the video/image encoding method disclosed in at least one of the embodiments of the present disclosure is stored.

According to an embodiment of the present disclosure, there is provided a computer-readable digital storage medium in which encoded information or encoded video/image information causing the decoding apparatus to perform the video/image decoding method disclosed in at least one of the embodiments of the present disclosure is stored.

Advantageous Effects

The present disclosure may have various effects. For example, according to an embodiment of the present document, overall image/video compression efficiency may be increased. In addition, according to an embodiment of the present document, the efficiency may be improved in the palette mode coding. In addition, according to an embodiment of the present document, an overall coding efficiency may be improved by efficiently binarizing escape values in the palette mode. In addition, according to an embodiment of the present document, efficient coding is possible by binarizing an escape value of the palette mode by utilizing a maximum value of the escape value that may be inferred by a quantization parameter in the palette mode, and since the number of bits is saved, binarization may be efficiently performed, compared with the related art method.

Effects that may be obtained through specific examples of the present document are not limited to the effects listed above. For example, various technical effects that a person having ordinary skill in the related art may understand or derive from the present disclosure may exist. Accordingly, specific effects of the present disclosure are not limited to those explicitly described in the present disclosure, and may include various effects that may be understood or derived from the technical characteristics of the present disclosure.

BRIEF DESCRIPTION OF THE DRAWINGS

FIG. 10 shows an example illustrating a horizontal and vertical traverse scan method used to code a palette index map.

DESCRIPTION OF EXEMPLARY EMBODIMENTS

Figure 1:
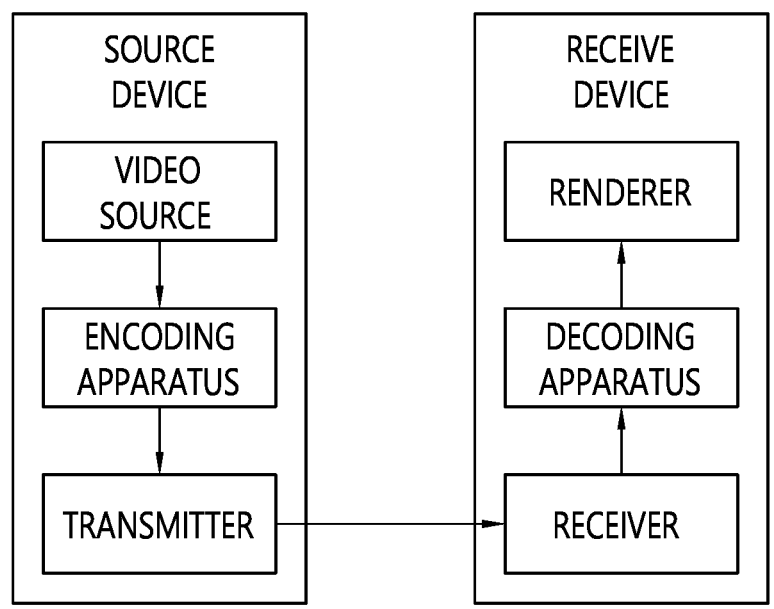
FIG. 1 schematically shows an example of a video/image coding system applicable to embodiments of the present disclosure.

The present disclosure may be modified in various ways and may have various embodiments, and specific embodiments will be illustrated in the drawings and described in detail. However, this does not intend to limit the present disclosure to the specific embodiments. Terms commonly used in this specification are used to describe a specific embodiment and is not used to limit the technical spirit of the present disclosure. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in the present disclosure are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of the present disclosure unless it deviates from the essence of the present disclosure.

In the present disclosure, the term "A or B" may mean "only A", "only B", or "both A and B". In other words, in the present disclosure, the term "A or B" may be interpreted to indicate "A and/or B". For example, in the present disclosure, the term "A, B or C" may mean "only A", "only B", "only C", or "any combination of A, B and C".

A slash "/" or a comma used in the present disclosure may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B", or "both A and B". Further, in the present disclosure, the expression "at least one of A or B" or "at least one of A and/or B" may be interpreted the same as "at least one of A and B".

Further, in the present disclosure, "at least one of A, B and C" may mean "only A", "only B", "only C", or "any combination of A, B and C". Further, "at least one of A, B or C" or "at least one of A, B and/or C" may mean "at least one of A, B and C".

Further, the parentheses used in the present disclosure may mean "for example". Specifically, in the case that "prediction (intra prediction)" is expressed, it may be indicated that "intra prediction" is proposed as an example of "prediction". In other words, the term "prediction" in the present disclosure is not limited to "intra prediction", and it may be indicated that "intra prediction" is proposed as an example of "prediction". Further, even in the case that "prediction (i.e., intra prediction)" is expressed, it may be indicated that "intra prediction" is proposed as an example of "prediction".

The present disclosure relates to video/image coding. For example, the methods/embodiments disclosed in the present disclosure may be applied to a method disclosed in versatile video coding (VVC). Further, the methods/embodiments disclosed in the present disclosure may be applied to a method disclosed in the essential video coding (EVC) standard, the AOMedia Video 1 (AV1) standard, the 2nd generation of audio video coding standard (AVS2), or the next generation video/image coding standard (ex. H.267 or H.268, etc.).

The present disclosure presents various embodiments of video/image coding, and the embodiments may be performed in combination with each other unless otherwise mentioned.

In the present disclosure, a video may mean a set of a series of images according to the passage of time. A picture generally means a unit representing one image in a specific time period, and a slice/tile is a unit constituting a part of the picture in coding. The slice/tile may include one or more coding tree units (CTUs). One picture may consist of one or more slices/tiles. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of complete tiles or an integer number of consecutive complete CTU rows within a tile of a picture that may be exclusively contained in a single NAL unit.

Meanwhile, one picture may be divided into two or more subpictures. The subpicture may be a rectangular region of one or more slices within the picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component. Alternatively, a sample may mean a pixel value in the spatial domain, or may mean a transform coefficient in the frequency domain when the pixel value is transformed into the frequency domain.

A unit may represent a basic unit of image processing. The unit may include at least one of a specific region of the picture and information related to the region. One unit may include one luma block and two chroma (ex. Cb, cr) blocks. The unit may be used interchangeably with terms such as block or area in some cases. In a general case, an M×N block may include samples (or sample arrays) or a set (or array) of transform coefficients of M columns and N rows.

Also, in the present disclosure, at least one of quantization/dequantization and/or transform/inverse transform may be omitted. When the quantization/dequantization is omitted, the quantized transform coefficient may be referred to as a transform coefficient. When the transform/inverse transform is omitted, transform coefficients may be called coefficients or residual coefficients, or may still be called transform coefficients for the sake of uniformity of expression.

In the present disclosure, a quantized transform coefficient and a transform coefficient may be referred to as a transform coefficient and a scaled transform coefficient, respectively. In this case, the residual information may include information on the transform coefficient(s), and the information on the transform coefficient(s) may be signaled through a residual coding syntax. Transform coefficients may be derived based on residual information (or information on transform coefficient(s)), and scaled transform coefficients may be derived through inverse transform (scaling) on the transform coefficients. Residual samples may be derived based on an inverse transform (transform) for the scaled transform coefficients. This may be applied/expressed in other parts of the present disclosure as well.

In the present disclosure, technical features individually explained in one drawing may be individually implemented, or may be simultaneously implemented.

Hereinafter, preferred embodiments of the present disclosure are described more specifically with reference to the accompanying drawings. Hereinafter, in the drawings, the same reference numeral is used in the same element, and a redundant description of the same element may be omitted.

FIG. 1 illustrates an example of a video/image coding system to which the embodiments of the present document may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
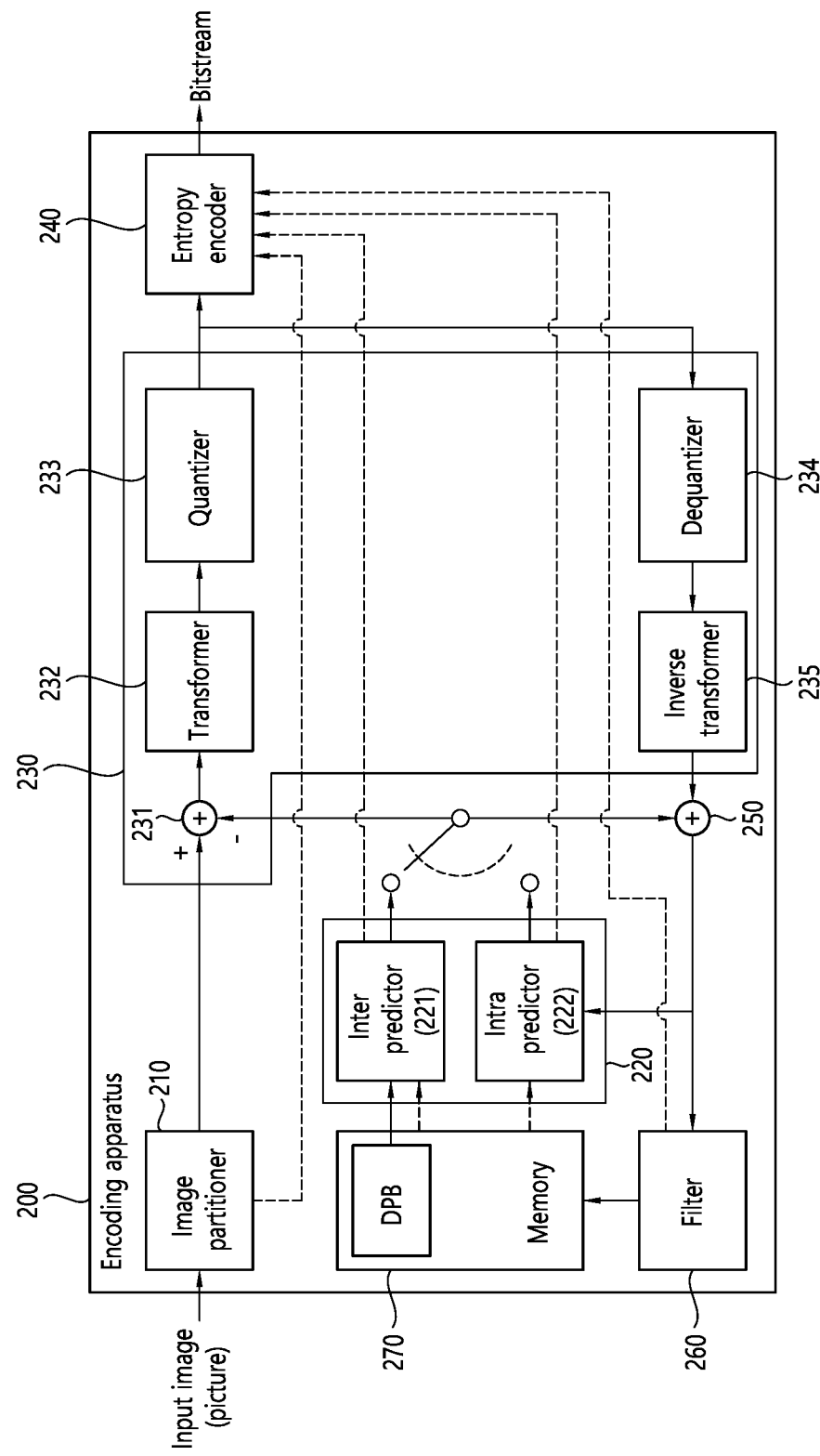
FIG. 2 is a diagram schematically illustrating a configuration of a video/image encoding apparatus to which embodiments of the present disclosure are applicable.

FIG. 2 is a diagram schematically illustrating a configuration of a video/image encoding apparatus to which embodiments of the present disclosure are applicable. Hereinafter, an encoding apparatus may include an image encoding apparatus and/or a video encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present disclosure may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may generate a residual signal (residual block, residual sample array) by subtracting a predicted signal (predicted block, prediction sample array) output from the inter predictor 221 or the intra predictor 222 from the input image signal (original block, original sample array), and the generated residual signal is transmitted to the transformer 232. In this case, as illustrated, the unit for subtracting the predicted signal (predicted block, prediction sample array) from the input image signal (original block, original sample array) within an encoder 200 may be called the subtractor 231. The predictor may perform prediction for a block to be processed (hereinafter, referred to as a current block), and generate a predicted block including prediction samples of the current block. The predictor may determine whether intra prediction is applied or inter prediction is applied in units of the current block or the CU. The predictor may generate various information on prediction, such as prediction mode information, to transfer the generated information to the entropy encoder 240 as described later in the description of each prediction mode. The information on prediction may be encoded by the entropy encoder 240 to be output in a form of the bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 200 may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, a sample value in a picture may be signaled based on information on a palette index and a palette table.

The predicted signal generated through the predictor (including the inter predictor 221 and/or the intra predictor 222) may be used to generate a reconstructed signal or used to generate a residual signal. The transformer 232 may generate transform coefficients by applying the transform technique to the residual signal. For example, the transform technique may include at least one of a discrete cosine transform (DCT), a discrete sine transform (DST), a Karhunen-Loeve transform (KLT), a graph-based transform (GBT), or a conditionally non-linear transform (CNT). Here, when the relationship information between pixels is illustrated as a graph, the GBT means the transform obtained from the graph. The CNT means the transform which is acquired based on a predicted signal generated by using all previously reconstructed pixels. In addition, the transform process may also be applied to a pixel block having the same size of the square, and may also be applied to the block having a variable size rather than the square.

The quantizer 233 may quantize the transform coefficients to transmit the quantized transform coefficients to the entropy encoder 240, and the entropy encoder 240 may encode the quantized signal (information on the quantized transform coefficients) to the encoded quantized signal to the bitstream. The information on the quantized transform coefficients may be called residual information. The quantizer 233 may rearrange the quantized transform coefficients having a block form in a one-dimensional vector form based on a coefficient scan order, and also generate the information on the quantized transform coefficients based on the quantized transform coefficients of the one dimensional vector form. The entropy encoder 240 may perform various encoding methods, for example, such as an exponential Golomb coding, a context-adaptive variable length coding (CAVLC), and a context-adaptive binary arithmetic coding (CABAC). The entropy encoder 240 may also encode information (e.g., values of syntax elements and the like) necessary for reconstructing video/image other than the quantized transform coefficients together or separately. The encoded information (e.g., encoded video/image information) may be transmitted or stored in units of network abstraction layer (NAL) unit in a form of the bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements to be described later in the present disclosure may be encoded through the aforementioned encoding procedure and thus included in the bitstream. The bitstream may be transmitted through a network, or stored in a digital storage medium. Here, the network may include a broadcasting network and/or a communication network, or the like, and the digital storage medium may include various storage media such as USB, SD, CD, DVD, Blue-ray, HDD, and SSD. A transmitter (not illustrated) for transmitting the signal output from the entropy encoder 240 and/or a storage (not illustrated) for storing the signal may be configured as the internal/external elements of the encoding apparatus 200, or the transmitter may also be included in the entropy encoder 240.

The quantized transform coefficients output from the quantizer 233 may be used to generate a predicted signal. For example, the dequantizer 234 and the inverse transformer 235 apply dequantization and inverse transform to the quantized transform coefficients, such that the residual signal (residual block or residual samples) may be reconstructed. The adder 250 adds the reconstructed residual signal to the predicted signal output from the inter predictor 221 or the intra predictor 222, such that the reconstructed signal (reconstructed picture, reconstructed block, reconstructed sample array) may be generated. As in the case where the skip mode is applied, if there is no residual for the block to be processed, the predicted block may be used as the reconstructed block. The adder 250 may be called a reconstructor or a reconstructed block generator. The generated reconstructed signal may be used for the intra prediction of the next block to be processed within the current picture, and as described later, also used for the inter prediction of the next picture through filtering.

Meanwhile, a luma mapping with chroma scaling (LMCS) may also be applied in a picture encoding and/or reconstruction process.

The filter 260 may apply filtering to the reconstructed signal, thereby improving subjective/objective image qualities. For example, the filter 260 may apply various filtering methods to the reconstructed picture to generate a modified reconstructed picture, and store the modified reconstructed picture in the memory 270, specifically, the DPB of the memory 270. Various filtering methods may include, for example, a deblocking filtering, a sample adaptive offset, an adaptive loop filter, a bilateral filter, and the like. The filter 260 may generate various filtering-related information to transfer the generated information to the entropy encoder 240, as described later in the description of each filtering method. The filtering-related information may be encoded by the entropy encoder 240 to be output in a form of the bitstream.

The modified reconstructed picture transmitted to the memory 270 may be used as the reference picture in the inter predictor 221. If the inter prediction is applied by the inter predictor, the encoding apparatus may avoid the prediction mismatch between the encoding apparatus 200 and the decoding apparatus, and also improve coding efficiency.

The DPB of the memory 270 may store the modified reconstructed picture to be used as the reference picture in the inter predictor 221. The memory 270 may store motion information of the block in which the motion information within the current picture is derived (or encoded) and/or motion information of the blocks within the previously reconstructed picture. The stored motion information may be transferred to the inter predictor 221 to be utilized as motion information of the spatial neighboring block or motion information of the temporal neighboring block. The memory 270 may store the reconstructed samples of the reconstructed blocks within the current picture, and transfer the reconstructed samples to the intra predictor 222.

Figure 3:
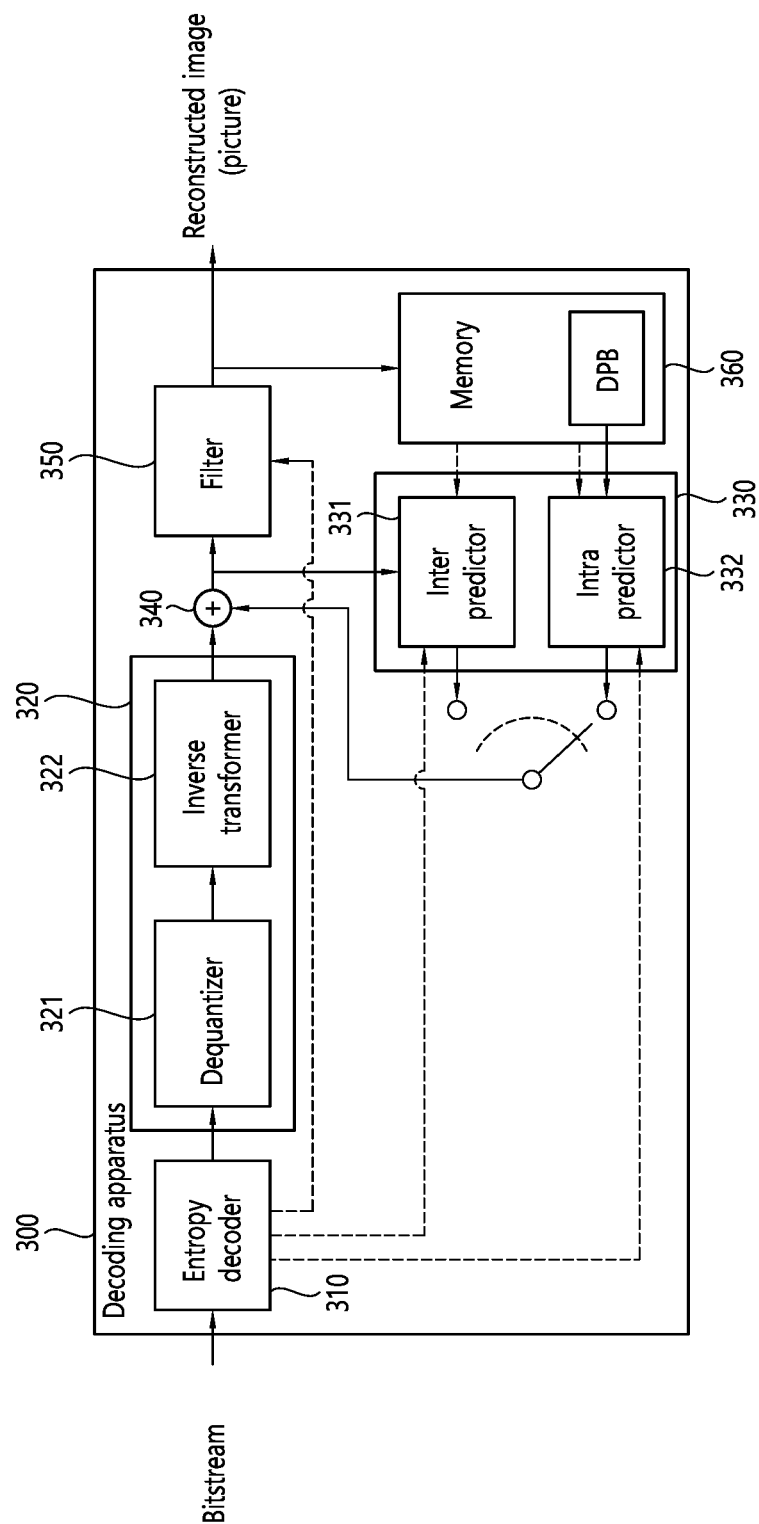
FIG. 3 is a diagram schematically illustrating a configuration of a video/image decoding apparatus to which embodiments of the present disclosure are applicable.

FIG. 3 is a diagram schematically illustrating a configuration of a video/image decoding apparatus to which embodiments of the present disclosure are applicable. Hereinafter, a decoding apparatus may include an image decoding apparatus and/or a video decoding apparatus.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive the signal output from the encoding apparatus illustrated in FIG. 2 in a form of the bitstream, and the received signal may be decoded through the entropy decoder 310. For example, the entropy decoder 310 may derive information (e.g., video/image information) necessary for the image reconstruction (or picture reconstruction) by parsing the bitstream. The video/image information may further include information on various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information on the parameter set and/or the general constraint information. The signaled/received information and/or syntax elements to be described later in the present disclosure may be decoded through the decoding procedure and acquired from the bitstream. For example, the entropy decoder 310 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information on prediction among the information decoded by the entropy decoder 310 may be provided to the predictor (the inter predictor 332 and the intra predictor 331), and a residual value at which the entropy decoding is performed by the entropy decoder 310, that is, the quantized transform coefficients and the related parameter information may be input to the residual processor 320. The residual processor 320 may derive a residual signal (residual block, residual samples, residual sample array). In addition, the information on filtering among the information decoded by the entropy decoder 310 may be provided to the filter 350. Meanwhile, a receiver (not illustrated) for receiving the signal output from the encoding apparatus may be further configured as the internal/external element of the decoding apparatus 300, or the receiver may also be a component of the entropy decoder 310. Meanwhile, the decoding apparatus according to the present disclosure may be called a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information on prediction output from the entropy decoder 310, and determine a specific intra/inter prediction mode.

The predictor may generate the predicted signal based on various prediction methods to be described later. For example, the predictor may not only apply the intra prediction or the inter prediction for the prediction of one block, but also apply the intra prediction and the inter prediction at the same time. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, information on a palette table and a palette index may be included in the video/image information and signaled.

The intra predictor 331 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 331 may also determine the prediction mode applied to the current block using the prediction mode applied to the neighboring block.

The inter predictor 332 may induce the predicted block of the current block based on the reference block (reference sample array) specified by the motion vector on the reference picture. At this time, in order to decrease the amount of the motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. For example, the inter predictor 332 may configure a motion information candidate list based on the neighboring blocks, and derive the motion vector and/or the reference picture index of the current block based on received candidate selection information. The inter prediction may be performed based on various prediction modes, and the information on the prediction may include information indicating the mode of the inter prediction of the current block.

The adder 340 may add the acquired residual signal to the predicted signal (predicted block, prediction sample array) output from the predictor (including the inter predictor 332 and/or the intra predictor 331) to generate the reconstructed signal (reconstructed picture, reconstructed block, reconstructed sample array). As in the case where the skip mode is applied, if there is no residual for the block to be processed, the predicted block may be used as the reconstructed block.

The adder 340 may be called a reconstructor or a reconstructed block generator. The generated reconstructed signal may be used for the intra prediction of a next block to be processed within the current picture, and as described later, may also be output through filtering or may also be used for the inter prediction of a next picture.

Meanwhile, a luma mapping with chroma scaling (LMCS) may also be applied in the picture decoding process.

The filter 350 may apply filtering to the reconstructed signal, thereby improving the subjective/objective image qualities. For example, the filter 350 may apply various filtering methods to the reconstructed picture to generate a modified reconstructed picture, and transmit the modified reconstructed picture to the memory 360, specifically, the DPB of the memory 360. Various filtering methods may include, for example, a deblocking filtering, a sample adaptive offset, an adaptive loop filter, a bidirectional filter, and the like.

The (modified) reconstructed picture stored in the DPB of the memory 360 may be used as the reference picture in the inter predictor 332. The memory 360 may store motion information of the block in which the motion information within the current picture is derived (decoded) and/or motion information of the blocks within the previously reconstructed picture. The stored motion information may be transferred to the inter predictor 260 to be utilized as motion information of the spatial neighboring block or motion information of the temporal neighboring block. The memory 360 may store the reconstructed samples of the reconstructed blocks within the current picture, and transfer the stored reconstructed samples to the intra predictor 331.

In the present disclosure, the embodiments described in the filter 260, the inter predictor 221, and the intra predictor 222 of the encoding apparatus 200 may be equally applied to the filter 350, the inter predictor 332, and the intra predictor 331 of the decoding apparatus 300.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Figure 4:
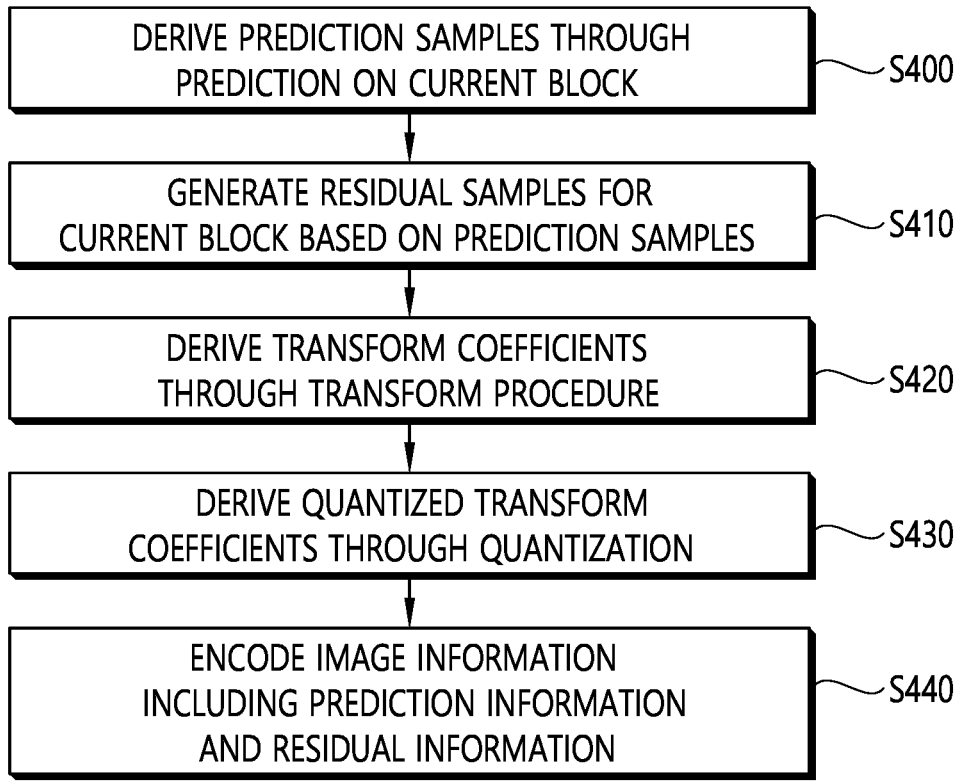
FIG. 4 shows an example of a schematic video/image encoding method to which embodiments of the present disclosure are applicable.

FIG. 4 shows an example of a schematic video/image encoding method to which embodiments of the present disclosure are applicable.

The method disclosed in FIG. 4 may be performed by the encoding apparatus 200 of FIG. 2 described above. Specifically, S400 may be performed by the inter predictor 221 or the intra predictor 222 of the encoding apparatus 200, and S410, S420, S430, and S440 may be performed by the subtractor 231, the transformer 232, the quantizer 233, and the entropy encoder 240.

Referring to FIG. 4, the encoding apparatus may derive prediction samples through prediction on a current block (S400). The encoding apparatus may determine whether to perform inter prediction or intra prediction on the current block, and may determine a specific inter prediction mode or a specific intra prediction mode based on the RD cost. The encoding apparatus may derive prediction samples for the current block according to the determined mode.

The encoding apparatus may derive residual samples by comparing original samples and prediction samples for the current block (S410).

The encoding apparatus may derive transform coefficients through a transform procedure for residual samples (S420), and quantize the derived transform coefficients to derive quantized transform coefficients (S430). Quantization may be performed based on a quantization parameter. A transform procedure and/or a quantization procedure may be omitted. When the transform procedure is omitted, a (quantized) (residual) coefficient for residual samples may be coded according to a residual coding technique. The (quantized) (residual) coefficient may also be referred to as a (quantized) transform coefficient for unification of terms.

The encoding apparatus may encode image information including prediction information and residual information, and output the encoded image information in the form of a bitstream (S440). Prediction information is information related to a prediction procedure and may include prediction mode information and information regarding motion information (e.g., when inter prediction is applied). The residual information may include information on (quantized) transform coefficients. The residual information may be entropy-coded.

The output bitstream may be transmitted to the decoding apparatus through a storage medium or a network.

Figure 5:
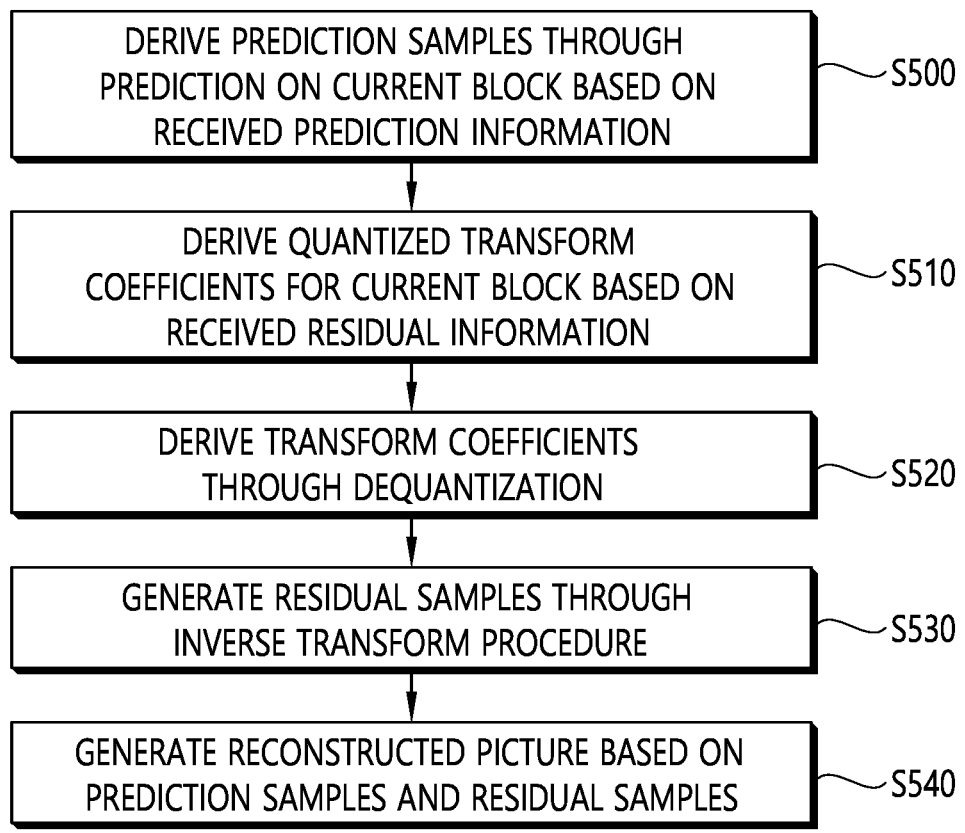
FIG. 5 shows an example of a schematic video/image decoding method to which embodiments of the present disclosure are applicable.

FIG. 5 shows an example of a schematic video/image decoding method to which embodiments of the present disclosure are applicable.

The method disclosed in FIG. 5 may be performed by the decoding apparatus 300 of FIG. 3 described above. Specifically, S500 may be performed by the inter predictor 332 or the intra predictor 331 of the decoding apparatus 300. A procedure of deriving values of related syntax elements by decoding the prediction information included in the bitstream in S500 may be performed by the entropy decoder 310 of the decoding apparatus 300. S510, S520, S530, and S540 may be performed by the entropy decoder 310, the dequantizer 321, the inverse transformer 322, and the adder 340 of the decoding apparatus 300, respectively.

Referring to FIG. 5, the decoding apparatus may perform an operation corresponding to the operation performed by the encoding apparatus. The decoding apparatus may perform inter prediction or intra prediction on the current block based on the received prediction information and derive prediction samples (S500).

The decoding apparatus may derive quantized transform coefficients for the current block based on the received residual information (S510). The decoding apparatus may derive quantized transform coefficients from residual information through entropy decoding.

The decoding apparatus may dequantize the quantized transform coefficients to derive transform coefficients (S520). Dequantization may be performed based on a quantization parameter.

The decoding apparatus derives residual samples through an inverse transform procedure on the transform coefficients (S530).

Inverse transform procedure and/or dequantization procedure may be omitted. When the inverse transform procedure is omitted, (quantized) (residual) coefficients may be derived from the residual information, and residual samples may be derived based on the (quantized) (residual) coefficients.

The decoding apparatus may generate reconstructed samples for the current block based on the prediction samples and the residual samples, and generate a reconstructed picture based thereon. (S540) As described above, the in-loop filtering procedure may be further applied to the reconstructed picture thereafter.

Meanwhile, as described above, the encoding apparatus may perform entropy encoding based on various encoding methods such as, for example, exponential Golomb, context-adaptive variable length coding (CAVLC), and context-adaptive binary arithmetic coding (CABAC). Also, the decoding apparatus may perform entropy decoding based on a coding method such as exponential Golomb coding, CAVLC, or CABAC. Hereinafter, an entropy encoding/decoding procedure will be described.

Figure 6:
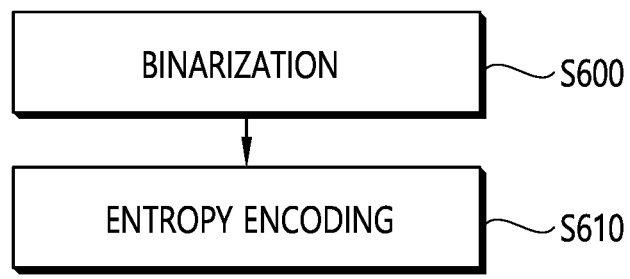
FIG. 6 schematically illustrates an example of an entropy encoding method to which embodiments of the present disclosure are applicable, and FIG. 7 schematically illustrates an entropy encoder in an encoding apparatus.
Figure 7:
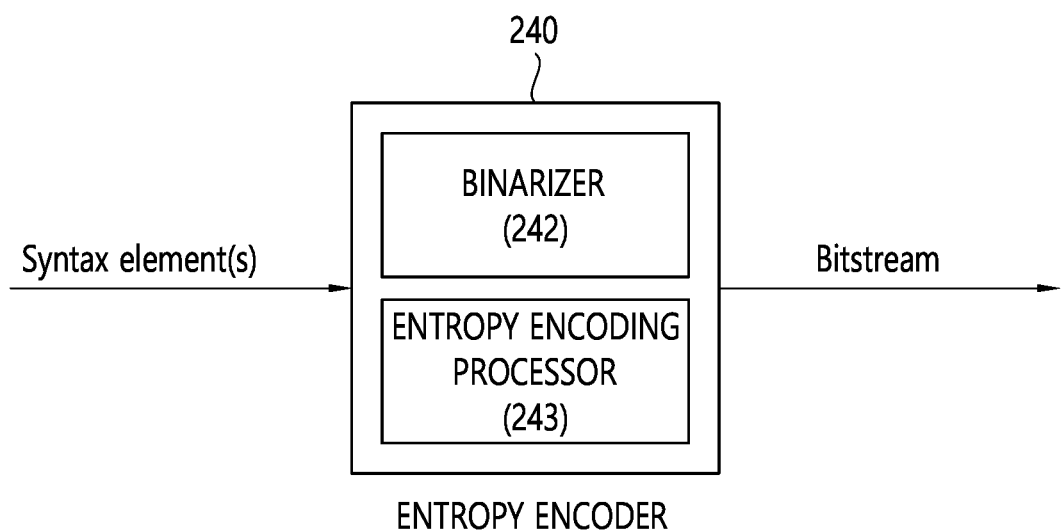

FIG. 6 schematically illustrates an example of an entropy encoding method to which embodiments of the present disclosure are applicable, and FIG. 7 schematically illustrates an entropy encoder in an encoding apparatus. The entropy encoder in the encoding apparatus of FIG. 7 may be applied to be the same or to correspond to the entropy encoder 240 of the encoding apparatus 200 of FIG. 2 described above.

Referring to FIGS. 6 and 7, an encoding apparatus (entropy encoder) may perform an entropy coding procedure on image/video information. The image/video information may include partitioning-related information, prediction-related information (e.g., inter/intra prediction classification information, intra prediction mode information, inter prediction mode information, etc.), residual information, in-loop filtering related information, etc. or may include various syntax elements related thereto. Entropy coding may be performed in units of syntax elements. S600 to S610 may be performed by the entropy encoder 240 of the encoding apparatus 200 of FIG. 2 described above.

The encoding apparatus may perform binarization on a target syntax element (S600). Here, the binarization may be based on various binarization methods such as a truncated rice binarization process and a fixed-length binarization process, and a binarization method for a target syntax element may be predefined. The binarization procedure may be performed by a binarizer 242 in the entropy encoder 240.

The encoding apparatus may perform entropy encoding on the target syntax element (S610). The encoding apparatus may perform normal coding-based (context-based) or bypass coding-based encoding on a bin string of a target syntax element based on an entropy coding technique such as context-adaptive arithmetic coding (CABAC) or context-adaptive variable length coding (CAVLC) and an output thereof may be included in a bitstream. The entropy encoding procedure may be performed by the entropy encoding processor 243 in the entropy encoder 240. As described above, the bitstream may be transmitted to the decoding apparatus through a (digital) storage medium or a network.

Figure 8:
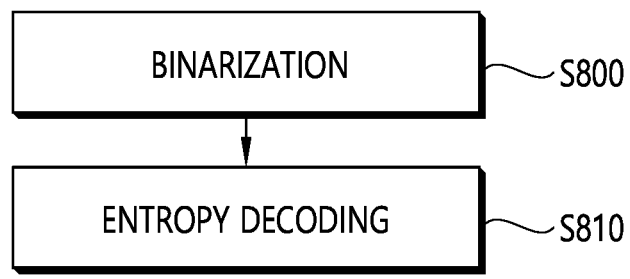
FIG. 8 schematically shows an example of an entropy decoding method to which embodiments of the present disclosure are applicable, and FIG. 9 schematically shows an entropy decoder in a decoding apparatus.
Figure 9:
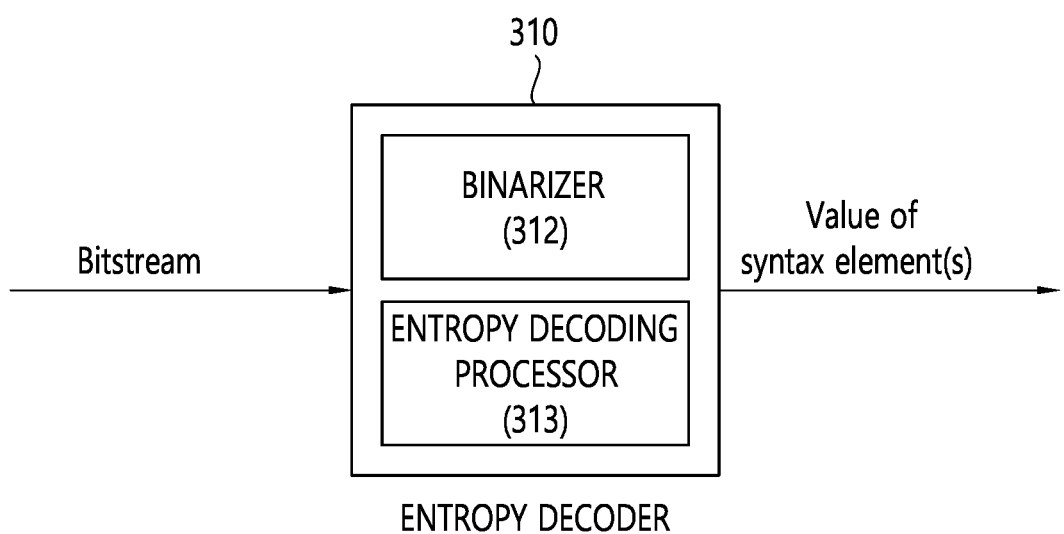

FIG. 8 schematically shows an example of an entropy decoding method to which embodiments of the present disclosure are applicable, and FIG. 9 schematically shows an entropy decoder in a decoding apparatus. The entropy decoder in the decoding apparatus of FIG. 9 may also be applied to be the same or to correspond to the entropy decoder 310 of the decoding apparatus 300 of FIG. 3 described above.

Referring to FIGS. 8 and 9, the decoding apparatus (entropy decoder) may decode encoded image/video information. The image/video information may include partitioning-related information, prediction-related information (e.g., inter/intra prediction classification information, intra prediction mode information, inter prediction mode information, etc.), residual information, in-loop filtering related information, etc. or may include various syntax elements related thereto. Entropy coding may be performed in units of syntax elements. S800 and S810 may be performed by the entropy decoder 310 of the decoding apparatus 300 of FIG. 3 described above.

The decoding apparatus may perform binarization on the target syntax element (S800). Here, the binarization may be based on various binarization methods such as a truncated rice binarization process and a fixed-length binarization process, and the binarization method for a target syntax element may be predefined. The decoding apparatus may derive available bin strings (bin string candidates) for available values of a target syntax element through a binarization procedure. The binarization procedure may be performed by the binarizer 312 in the entropy decoder 310.

The decoding apparatus may perform entropy decoding on the target syntax element (S810). The decoding apparatus, while sequentially decoding and parsing each bin for the target syntax element from the input bit(s) in the bitstream, compares the derived bin string with available bin strings for the corresponding syntax element. If the derived bin string is the same as one of the available bin strings, a value corresponding to the corresponding bin string may be derived as a value of the corresponding syntax element. If not, the aforementioned procedure may be performed again after further parsing the next bit in the bitstream. Through the process, the corresponding information may be signaled using a variable length bit without using a start bit or an end bit for specific information (a specific syntax element) in the bitstream. Through this, relatively fewer bits may be allocated to a low value, and overall coding efficiency may be increased.

The decoding apparatus may perform context-based or bypass-based decoding on each bin in a bin string from a bitstream based on an entropy coding technique such as CABAC or CAVLC. Here, the bitstream may include various information for image/video decoding as described above. As described above, the bitstream may be transmitted to the decoding apparatus through a (digital) storage medium or a network.

In the present disclosure, a table (syntax table) including syntax elements may be used to indicate signaling of information from the encoding apparatus to the decoding apparatus. The order of syntax elements of the syntax table used in the present disclosure may indicate a parsing order of syntax elements from a bitstream. The encoding apparatus may construct and encode the syntax table so that the syntax elements may be parsed by the decoding apparatus in the parsing order, and the decoding apparatus may parse and decode the syntax elements of the corresponding syntax table from the bitstream according to the parsing order to obtain the values of the syntax elements.

Meanwhile, as described above, the encoding apparatus may derive a residual block (residual samples) based on a block (prediction samples) predicted through intra/inter/IBC/palette prediction, etc., and apply transform and quantization on the derived residual samples to derive quantized transform coefficients. Information (residual information) on the quantized transform coefficients may be included in a residual coding syntax to be encoded and may then be output in the form of a bitstream. The decoding apparatus may obtain information (residual information) on the quantized transform coefficients from the bitstream, and may perform decoding to derive quantized transform coefficients. The decoding apparatus may derive residual samples through dequantization/inverse transformation based on the quantized transform coefficients. As described above, at least one of the quantization/dequantization and/or transform/inverse transform may be omitted. When the transform/inverse transform is omitted, the transform coefficients may be called coefficients or residual coefficients, or may still be called transform coefficients for uniformity of expression. Whether the transform/inverse transform is omitted may be signaled based on transform_skip_flag. For example, transform_skip_flag having a value of 1 may indicate that the transform/inverse transform is skipped, and this may be referred to as a transform skip mode.

In general, in video/image coding, a quantization rate may be changed, and compression may be adjusted using the changed quantization rate. From an implementation point of view, a quantization parameter QP may be used instead of using a quantization rate directly in consideration of complexity. For example, quantization parameters of integer values from 0 to 63 may be used, and each quantization parameter value may correspond to an actual quantization rate. Also, for example, a quantization parameter $QP_Y$ for a luma component (luma sample) and a quantization parameter $QP_C$ for a chroma component (chroma sample) may be set to be different.

In the quantization process, the transform coefficient C is input and divided by a quantization rate $Q_{step}$ to obtain a quantized transform coefficient C'. In this case, in consideration of computational complexity, the quantization rate is multiplied by a scale to form an integer, and a shift operation may be performed by a value corresponding to the scale value. A quantization scale may be derived based on the product of the quantization rate and the scale value. That is, the quantization scale may be derived according to the QP. For example, by applying the quantization scale to the transform coefficient C, a quantized transform coefficient C' may be derived based thereon.

The dequantization process is an inverse process of the quantization process. The quantized transform coefficient C' may be multiplied by a quantization rate $Q_{step}$, and a restored transform coefficient C' may be obtained based thereon. In this case, a level scale may be derived according to the quantization parameter, and the level scale may be applied to the quantized transform coefficient C' to derive reconstructed transform coefficient C". The reconstructed transform coefficient C" may be slightly different from the initial transform coefficient C due to loss in the transform and/or quantization process. Accordingly, in the encoding apparatus, dequantization may be performed in the same manner as in the decoding apparatus.

Meanwhile, prediction may be performed based on palette coding. Palette coding is a useful technique for representing blocks including a small number of unique color values. Instead of applying prediction and transform to a block, in a palette mode, an index is signaled to indicate a value of each sample. The palette mode is useful for saving video memory buffer space. A block may be coded using a palette mode (e.g., MODE_PLT). In order to decode this encoded block, the decoder should decode a palette entry and index. The palette entry may be represented by a palette table and may be encoded by a palette table coding tool.

Palette coding may be referred to as (intra) palette mode or (intra) palette coding mode or the like. The current block may be restored according to the palette coding or the palette mode. Palette coding may be considered as an example of intra coding or may be viewed as one of intra prediction methods. However, similar to the skip mode described above, a separate residual value for the corresponding block may not be signaled.

For example, the palette mode may be used to improve coding efficiency for screen content such as computer generated video including significant amounts of text and graphics. In a general natural image acquired by a camera, there is a difference in values even between pixels representing the same object due to shading, motion, camera noise, and the like. However, in the case of computer-generated images and videos such as animations and texts, pixel values existing in the same region are not significantly different or a specific region may be expressed with only a limited number of pixels or not having a large difference in pixel values within the same region. In order to utilize this characteristic, a set of pixels that may configure a specific region is configured as a palette or palette table, and the values of pixels representing the corresponding region may be designated as each palette entry to represent the samples of the block.

For example, when the palette mode is selected, information on the palette table may be signaled. The palette table may include an index corresponding to each pixel. The palette table may construct a palette prediction table from pixel values used in a previous block. For example, previously used pixel values are stored in a specific buffer (palette predictor), and palette predictor information (palette_predictor_run) for constructing the current palette may be received from this buffer. That is, the palette predictor may include data indicating an index for at least a portion of a palette index map of the current block. When the palette entry for representing the current block is not sufficient with the palette prediction entry constructed from the palette predictor, pixel information for the current palette entry may be transmitted separately.

The palette mode is signaled at a CU level and may generally be used when most pixels in a CU may be represented by a set of representative pixel values. That is, in the palette mode, samples in a CU may be represented as a set of representative pixel values. Such a set may be referred to as a palette. In the case of a sample having a value close to the pixel value in the palette, a palette index (palette_idx_idc) corresponding to the pixel value in the palette or information (run_copy_flag, copy_above_palette_indices_flag) that may indicate the index may be signaled. In the case of a sample with a pixel value other than the palette entry, the sample may be marked with an escape symbol and the quantized sample value may be signaled directly. In the present disclosure, a pixel or pixel value may be referred to as a sample or sample value.

In order to decode a block coded in the palette mode, the decoder needs palette entry information and palette index information. When the palette index corresponds to an escape symbol, a (quantized) escape value may be signaled as an additional component. In addition, the encoder should derive an appropriate palette for the CU and deliver it to the decoder.

For efficient coding of palette entries, a palette predictor may be maintained. The palette predictor and the maximum size of the palette may be signaled in the SPS. Alternatively, the palette predictor and the palette maximum size may be predefined. For example, the palette predictor and the maximum palette size may be defined as 31 and 15, respectively, depending on whether the current block is a single tree or a dual tree. In the VVC standard, sps_palette_enabled_flag indicating whether the palette mode is available may be transmitted. Then, a pred_mode_plt_coding flag indicating whether the current coding unit is coded in the palette mode may be transmitted. The palette predictor may be initialized at the beginning of each brick or each slice.

For each entry in the palette predictor, a reuse flag may be signaled to indicate whether it is part of the current palette. The reuse flag may be transmitted using a run-length coding of zero. Thereafter, the number of new palette entries may be signaled using $0^{th}$ order exponential Golomb coding. Finally, a component value for a new palette entry may be signaled. After encoding the current CU, the palette predictor may be updated using the current palette, and entries of the previous palette predictor that are not reused in the current palette may be added to the end of the new palette predictor until reaching a maximum allowed size (palette stuffing).

The index may be coded using horizontal and vertical traverse scans to code the palette index map. The scan order may be explicitly signaled from the bitstream using flag information (e.g., palette_transpose_flag). Hereinafter, in the present disclosure, for convenience of description, the horizontal scan will be mainly described. Also, this may be applied to vertical scan as well.

Figure 10:
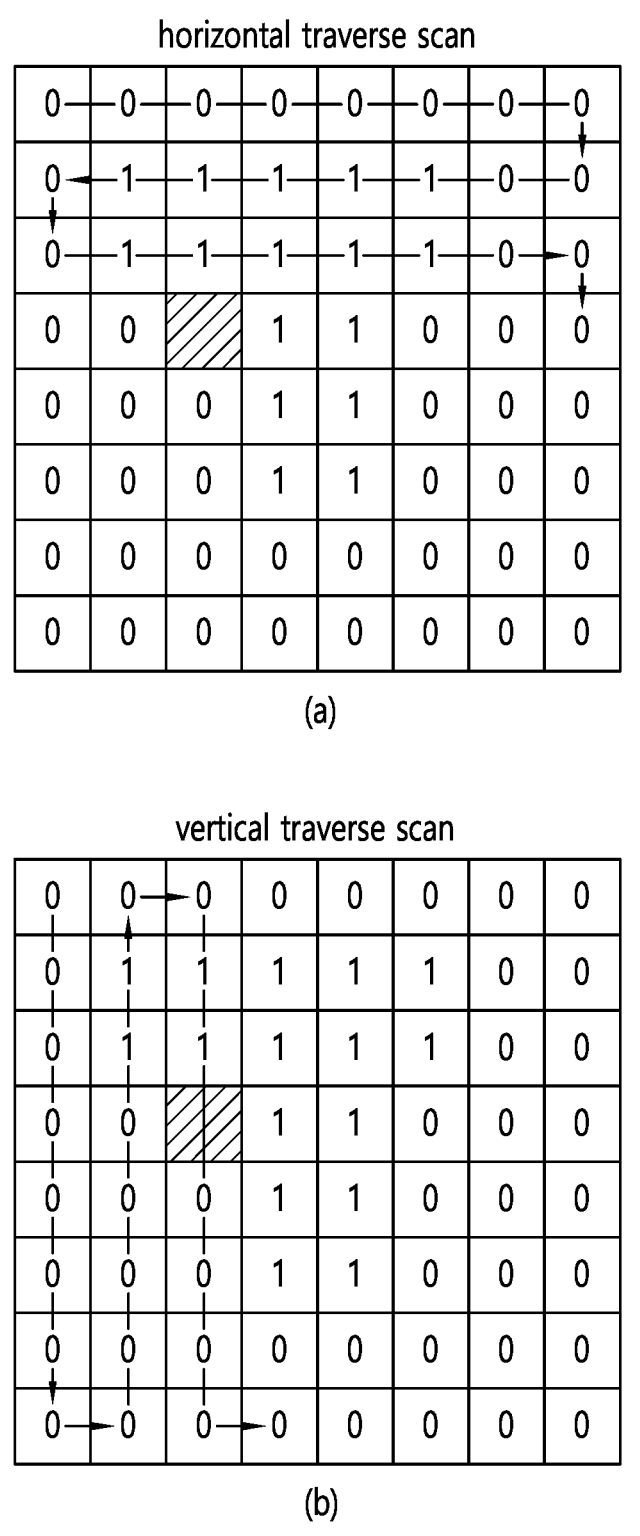

FIG. 10 shows an example for explaining horizontal and vertical traverse scan method used to code a palette index map.

FIG. 10(a) shows an example of coding a palette index map using a horizontal traverse scan, FIG. 10(b) shows an example of coding a palette index map using a vertical traverse scan.

As shown in (a) of FIG. 10, when horizontal scan is used, a palette index may be coded by scanning from samples in a first row (top row) to samples in the last row (bottom row) in the current block (i.e., current CU) in a horizontal direction.

As shown in FIG. 10(b), when vertical scan is used, the palette index may be coded by scanning from samples in a first column (leftmost column) to the last column (rightmost column) in the current block (i.e., current CU) in a vertical direction.

Meanwhile, the palette index may be coded using two palette sample modes, for example, "NDEX" mode and "COPY_ABOVE" mode may be used. The palette mode may be signaled using a flag indicating whether the mode is "NDEX" or "COPY_ABOVE". In this case, the escape symbol may be signaled in "NDEX" mode, and the same index as the current palette size may be allocated. For example, when the size of the current palette is 10, indexes #0 to #9 may refer to entry indexes in the palette, and index #10 may refer to an index for an escape symbol. If horizontal scan is used, flag except for a top row may be signaled, and if vertical scan is used or if previous mode is "COPY_ABOVE" mode, flag except for a first column may be signaled. In "COPY_ABOVE" mode, the palette index of a sample in an upper row may be copied. In "NDEX" mode, the palette index may be explicitly signaled. For both "NDEX" mode and "COPY_ABOVE" mode, a run value indicating the number of next samples to be coded using the same mode may be signaled. If the escape symbol is part of a run in "NDEX" mode or "COPY_ABOVE" mode, escape component values may be signaled for each escape symbol.

Coding for the palette index is as follows. First, the number of indexes for a CU may be signaled. The actual indices for the entire CU may then be signaled using fixed length coding. The number of indices and indices may be coded in a bypass mode. This allows index related bypass bins to be grouped together. Next, the palette sample mode (copy_above_palette_indices_flag) and the run may be signaled in an interleaved manner. Finally, component escape values corresponding to escape samples for the entire CU may be grouped together and coded in the bypass mode.

Figure 11:
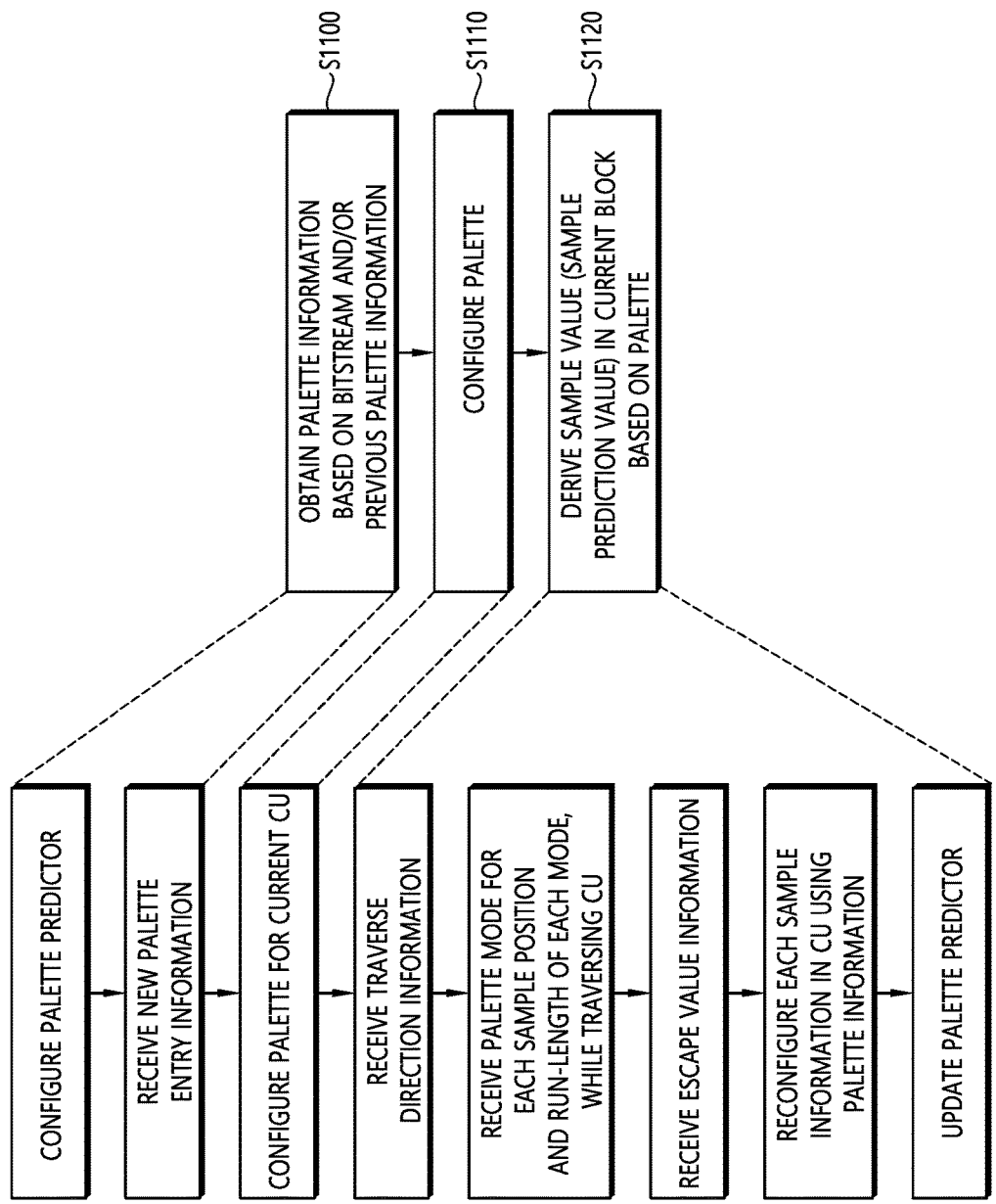
FIG. 11 is a diagram illustrating an example of a palette mode-based coding method.

FIG. 11 is a diagram illustrating an example of a palette mode-based coding method.

Referring to FIG. 11, the decoding apparatus may acquire palette information based on a bitstream and/or previous palette information (S1100).

In an embodiment, the decoding apparatus may configure a palette predictor. The palette information used in the previous block may be stored for a next palette CU (i.e., CU coded in palette mode) to be generated later, and this may be defined as a palette predictor entry.

The decoding apparatus may configure a palette based on the palette information (S1110).

For example, the decoding apparatus may receive new palette entry information and configure a palette for the current CU. For example, after receiving the received palette predictor reuse information and new palette entry information to be used in the current CU, the decoding apparatus may combine these two entry information to form one palette representing the current CU.

The decoding apparatus may derive a sample value (a sample prediction value) in the palette-based current block (S1120).

In an embodiment, the decoding apparatus may traverse palette index information, traverse direction (scan order) information, samples in the CU from the bitstream and receive palette mode information for each sample position and continuous length (run-length) information of each palette mode. In addition, the decoding apparatus may construct samples from the obtained palette information, while traversing the samples in the CU in a horizontal direction or a vertical direction based on the traverse direction (scan order) information. If the palette mode information indicates the COPY_ABOVE mode, each sample value in the CU may be derived by copying the index information of a left sample position in the vertical scan and copying the index information of an upper sample position in the horizontal scan. That is, prediction samples in the CU may be derived by deriving the value of each sample from the configured palette table based on the index information of each sample in the CU. Also, the decoding apparatus may reconstruct each sample information in the CU using the palette information and update the palette predictor.

Meanwhile, as described above, information (syntax elements) in the syntax table disclosed in the present disclosure may be included in image/video information, may be configured/encoded according to a coding technique (including palette coding) performed in the encoding apparatus, and may be transmitted in a form of a bitstream to the decoding apparatus. The decoding apparatus may parse/decode information (syntax element) in the corresponding syntax table. The decoding apparatus may perform a coding technique such as palette coding based on the decoded information, and may perform a block/image/video restoration (decoding) procedure based thereon.

The following Table 1 shows an example of a syntax structure including syntax elements related to palette mode-based coding for a coding unit.

TABLE 1

| | Descriptor |
|---|---|
| palette_coding( x0, y0, cbWidth, cbHeight, startComp, numComps ) { | |
|   palettePredictionFinished = 0 | |
|   NumPredictedPaletteEntries = 0 | |
|   for( predictorEntryIdx = 0; predictorEntryIdx < PredictorPaletteSize[ startComp ]  && | |
|     !palettePredictionFinished  && | |
|     NumPredictedPaletteEntries[ startComp ] < palette_max_size; predictorEntryIdx++ ) | |
|   { | |
|     palette_predictor_run | ae(v) |
|     if( palette_predictor_run  != 1 ) { | |
|       if( palette_predictor_run > 1 ) | |
|         predictorEntryIdx  +=  palette_predictor_run − 1 | |
|       PalettePredictorEntryReuseFlags[ predictorEntryIdx ] = 1 | |
|       NumPredictedPaletteEntries++ | |
|     } else | |
|       palettePredictionFinished = 1 | |
|   } | |
|   if( NumPredictedPaletteEntries < palette_max_size ) | |
|     num_signalled_palette_entries | ae(v) |
|   for( cIdx = startComp; cIdx < ( startComp + numComps); cIdx++ ) | |
|     for( i = 0; i < num_signalled_palette_entries; i++ ) | |
|       new_palette_entries[ cIdx ][ i ] | ae(v) |
|   if( CurrentPaletteSize[ startComp ] > 0 ) | |
|     palette_escape_val_present_flag | ae(v) |
|   if( MaxPaletteIndex > 0 ) { | |
|     num_palette_indices_minus1 | ae(v) |
|     adjust = 0 | |
|     for( i = 0; i  <= num_palette_indices_minus1; i++ ) { | |
|       if( MaxPaletteIndex − adjust > 0 ) { | |
|         palette_idx_idc | ae(v) |
|         PaletteIndexIdc[ i ] = palette_idx_idc | |
|       } | |
|       adjust = 1 | |
|     } | |
|     copy_above_indices_for_final_run_flag | ae(v) |
|     palette_transpose_flag | ae(v) |
|   } | |
|   if( treeType != DUAL_TREE_CHROMA && palette_escape_val_present_flag ) { | |
|     if( cu_qp_delta_enabled_flag  && !IsCuQpDeltaCoded ) { | |
|       cu_qp_delta_abs | ae(v) |
|       if( cu_qp_delta_abs ) | |
|         cu_qp_delta_sign_flag | ae(v) |
|     } | |
|   } | |

TABLE 1-continued

|  | Descriptor |
|---|---|
| ```
    if( treeType != DUAL_TREE_LUMA && palette_escape_val_present_flag ) {
      if( cu_chroma_qp_offset_enabled_flag  &&  !IsCuChromaQpOffsetCoded ) {
        cu_chroma_qp_offset_flag
        if( cu_chroma_qp_offset_flag )
          cu_chroma_qp_offset_idx
      }
    }
  }
  remainingNumIndices = num_palette_indices_minus1 + 1
  PaletteScanPos = 0
  log2CbWidth = Log2( cbWidth )
  log2CbHeight = Log2( cbHeight )
  while( PaletteScanPos < cbWidth*cbHeight ) {
    xC = x0 + TraverseScanOrder[ log2CbWidth ][ log2CbHeight ][ PaletteScanPos ][ 0 ]
    yC = y0 + TraverseScanOrder[ log2CbWidth ][ log2CbHeight ][ PaletteScanPos ][ 1 ]
    if( PaletteScanPos > 0 ) {
      xcPrev =
        x0 + TraverseScanOrder[ log2CbWidth ][ log2CbHeight ][ PaletteScanPos − 1 ][ 0 ]
      ycPrev =
        y0 + TraverseScanOrder[ log2CbWidth ][ log2CbHeight ][ PaletteScanPos − 1 ][ 1 ]
    }
    PaletteRunMinus1 = cbWidth * cbHeight − PaletteScanPos − 1
    RunToEnd = 1
    CopyAboveIndicesFlag[ xC ][ yC ] = 0
    if( MaxPaletteIndex > 0 )
      if( ( ( !palette_transpose_flag  &&   yC > 0 )  | |  ( palette_transpose_flag  &&
  xC > 0 ) )
          &&   CopyAboveIndicesFlag[ xcPrev ][ ycPrev ]   = =   0 )
        if( remainingNumIndices > 0   &&   PaletteScanPos < cbWidth* cbHeight − 1 )
        {
          copy_above_palette_indices_flag
          CopyAboveIndicesFlag[ xC ][ yC ] = copy_above_palette_indices_flag
        } else {
          if( PaletteScanPos   = =   cbWidth * cbHeight − 1   &&
  remainingNumIndices > 0 )
            CopyAboveIndicesFlag[ xC ][ yC ] = 0
          else
            CopyAboveIndicesFlag[ xC ][ yC ] = 1
        }
    if ( CopyAboveIndicesFlag[ xC ][ yC ]   = =   0 ) {
      currNumIndices = num_palette_indices_minus1 + 1 − remainingNumIndices
      PaletteIndexMap[ xC ][ yC ] = PaletteIndexIdc[ currNumIndices ]
    }
    if( MaxPaletteIndex > 0 ) {
      if( CopyAboveIndicesFlag[ xC ][ yC ]   = =   0 )
        remainingNumIndices − = 1
      if( remainingNumIndices > 0  | |   CopyAboveIndicesFlag[ xC ][ yC ]   !=
          copy_above_indices_for_final_run_flag ) {
        PaletteMaxRunMinus1 = cbWidth * cbHeight − PaletteScanPos − 1 −
          remainingNumIndices − copy_above_indices_for_final_run_flag
        RunToEnd = 0
        if( PaletteMaxRunMinus1 > 0 ) {
          palette_run_prefix
          if( ( palette_run_prefix > 1 )  &&  ( PaletteMaxRunMinus1   !=
            ( 1 << ( palette_run_prefix − 1 ) ) ) )
            palette_run_suffix
        }
      }
    }
    runPos = 0
    while ( runPos <= PaletteRunMinus1 ) {
      xR =
        x0 + TraverseScanOrder[ log2CbWidth ][ log2CbHeight ][ PaletteScanPos ][ 0 ]
      yR =
        y0 + TraverseScanOrder[ log2CbWidth ][ log2CbHeight ][ PaletteScanPos ][ 1 ]
      if( CopyAboveIndicesFlag[ xC ][ yC ]   = =   0 ) {
        CopyAboveIndicesFlag[ xR ][ yR ] = 0
        PaletteIndexMap[ xR ][ yR ] = PaletteIndexMap[ xC ][ yC ]
      } else {
        CopyAboveIndicesFlag[ xR ][ yR ] = 1
        if ( !palette_transpose_flag )
          PaletteIndexMap[ xR ][ yR ] = PaletteIndexMap[ xR ][ yR − 1 ]
        else
          PaletteIndexMap[ xR ][ yR ] = PaletteIndexMap[ xR − 1 ][ yR ]
      }
      runPos++
      PaletteScanPos ++
    }
  }
``` | ae(v)<br><br>ae(v)<br><br><br><br><br><br><br><br><br><br><br><br><br><br><br><br><br><br><br><br><br><br><br><br><br>ae(v)<br><br><br><br><br><br><br><br><br><br><br><br><br><br><br><br><br><br>ae(v)<br><br><br>ae(v) |

TABLE 1-continued

| | Descriptor |
|---|---|
| ```
if( palette_escape_val_present_flag ) {
    for( cIdx = startComp; cIdx < ( startComp + numComps ); cIdx++ )
        for( sPos = 0; sPos < cbWidth* cbHeight; sPos++ ) {
            xC = x0 + TraverseScanOrder[ log2CbWidth ][ log2CbHeight ][ sPos ][ 0 ]
            yC = y0 + TraverseScanOrder[ log2CbWidth ][ log2CbHeight ][ sPos ][ 1 ]
            if( PaletteIndexMap[ cIdx ][ xC ][ yC ]  = =   MaxPaletteIndex ) {
                palette_escape_val
                PaletteEscapeVal[ cIdx ][ xC ][ yC ] = palette_escape_val
            }
        }
}
}
``` | ae(v) |

Semantics of syntax elements included in the syntax of Table 1 may be expressed as shown in Table 2 below.

TABLE 2

In the following semantics, the array indices x0, y0 specify the location ( x0, y0 ) of the top-left luma sample of the considered coding block relative to the top-left luma sample of the picture. The array indices xC, yC specify the location ( xC, yC ) of the sample relative to the top-left luma sample of the picture. The array index startComp specifies the first colour component of the current palette table. startComp equal to 0 indicates the Y component; startComp equal to 1 indicates the Cb component; startComp equal to 2 indicates the Cr component. numComps specifies the number of colour components in the current palette table.
The predictor palette consists of palette entries from previous coding units that are used to predict the entries in the current palette.
The variable PredictorPaletteSize[ startComp ] specifies the size of the predictor palette for the first colour component of the current palette table startComp. PredictorPaletteSize is derived as specified in clause 8.4.5.3.
The variable PalettePredictorEntryReuseFlags[ i ] equal to 1 specifies that the i-th entry in the predictor palette is reused in the current palette.
PalettePredictorEntryReuseFlags[ i ] equal to 0 specifies that the i-th entry in the predictor palette is not an entry in the current palette. All elements of the array PalettePredictorEntryReuseFlags[ i ] are initialized to 0.
palette_predictor_run is used to determine the number of zeros that precede a non-zero entry in the array PalettePredictorEntryReuseFlags.
It is a requirement of bitstream conformance that the value of palette_predictor_run shall be in the range of 0 to ( PredictorPaletteSize − predictorEntryIdx ), inclusive, where predictorEntryIdx corresponds to the current position in the array PalettePredictorEntryReuseFlags. The variable NumPredictedPaletteEntries specifies the number of entries in the current palette that are reused from the predictor palette. The value of NumPredictedPaletteEntries shall be in the range of 0 to palette_max_size, inclusive.
num_signalled_palette_entries specifies the number of entries in the current palette that are explicitly signalled for the first colour component of the current palette table startComp.
When num_signalled_palette_entries is not present, it is inferred to be equal to 0.
The variable CurrentPaletteSize[ startComp ] specifies the size of the current palette for the first colour component of the current palette table startComp and is derived as follows:
  CurrentPaletteSize[ startComp ] = NumPredictedPaletteEntries +
  num_signalled_palette_entries     (1.8-1)
The value of CurrentPaletteSize[ startComp ] shall be in the range of 0 to palette_max_size, inclusive.
new_palette_entries[ cIdx ][ i ] specifies the value for the i-th signalled palette entry for the colour component cIdx.
The variable PredictorPaletteEntries[ cIdx ][ i ] specifies the i-th element in the predictor palette for the colour component cIdx.
The variable CurrentPaletteEntries[ cIdx ][ i ] specifies the i-th element in the current palette for the colour component cIdx and is derived as follows:
  numPredictedPaletteEntries = 0
  for( i = 0; i < PredictorPaletteSize[ startComp ]; i++ )
    if( PalettePredictorEntryReuseFlags[ i ] ) {
      for( cIdx =startComp; cIdx < ( startComp + numComps ); cIdx++ )
        CurrentPaletteEntries[ cIdx ][ numPredictedPaletteEntries ]=
          PredictorPaletteEntries[ cIdx ][ i ]      (1.8-2)
      numPredictedPaletteEntries++
    }

TABLE 2-continued

```
for( cIdx = startComp; cIdx < (startComp + numComps); cIdx++)
  for( i = 0; i < num_signalled_palette_entries[startComp]; i++ )
    CurrentPaletteEntries[ cIdx ][ numPredictedPaletteEntries + i ]=
      new_palette_entries[ cIdx ][ i ]
```
palette_escape_val_present_flag equal to 1 specifies that the current coding unit
contains at least one escape coded sample. escape_val_present_flag equal to 0 specifies
that there are no escape coded samples in the current coding unit. When not present, the
value of palette_escape_val_present_flag is inferred to be equal to 1.
The variable MaxPaletteIndex specifies the maximum possible value for a palette index
for the current coding unit. The value of MaxPaletteIndex is set equal to
CurrentPaletteSize[ startComp ] − 1 + palette_escape_val_present_flag.
num_palette_indices_minus1 plus 1 is the number of palette indices explicitly signalled
or inferred for the current block.
When num_palette_indices_minus1 is not present, it is inferred to be equal to 0.
palette_idx_idc is an indication of an index to the palette table, CurrentPaletteEntries.
The value of palette_idx_idc shall be in the range of 0 to MaxPaletteIndex, inclusive, for
the first index in the block and in the range of 0 to ( MaxPaletteIndex − 1 ), inclusive,
for the remaining indices in the block.
When palette_idx_idc is not present, it is inferred to be equal to 0.
The variable PaletteIndexIdc[ i ] stores the i-th palette_idx_idc explicitly signalled or
inferred. All elements of the array PaletteIndexIdc[ i ] are initialized to 0.
copy_above_indices_for_final_run_flag equal to 1 specifies that the palette indices of
the last positions in the coding unit are copied from the palette indices in the row above
if horizontal traverse scan is used or the palette indices in the left column if vertical
traverse scan is used. copy_above_indices_for_final_run_flag equal to 0 specifies that
the palette indices of the last positions in the coding unit are copied from
PaletteIndexIdc[ num_palette_indices_minus1 ].
When copy_above_indices_for_final_run_flag is not present, it is inferred to be equal to
0.
palette_transpose_flag equal to 1 specifies that vertical traverse scan is applied for
scanning the indices for samples in the current coding unit. palette_transpose_flag equal
to 0 specifies that horizontal traverse scan is applied for scanning the indices for samples
in the current coding unit. When not present, the value of palette_transpose_flag is
inferred to be equal to 0.
The array TraverseScanOrder specifies the scan order array for palette coding.
TraverseScanOrder is assigned the horizontal scan order HorTravScanOrder if
palette_transpose_flag is equal to 0 and TraverseScanOrder is assigned the vertical scan
order VerTravScanOrder if if palette_transpose_flag is equal to 1.
copy_above_palette_indices_flag equal to 1 specifies that the palette index is equal to
the palette index at the same location in the row above if horizontal traverse scan is used
or the same location in the left column if vertical traverse scan is used.
copy_above_palette_indices_flag equal to 0 specifies that an indication of the palette
index of the sample is coded in the bitstream or inferred.
The variable CopyAboveIndicesFlag[ xC ][ yC ] equal to 1 specifies that the palette
index is copied from the palette index in the row above (horizontal scan) or left column
(vertical scan). CopyAboveIndicesFlag[ xC ][ yC ] equal to 0 specifies that the palette
index is explicitly coded in the bitstream or inferred. The array indices xC, yC specify
the location ( xC, yC ) of the sample relative to the top-left luma sample of the picture.
The value of PaletteIndexMap[ xC ][ yC ] shall be in the range of 0 to ( MaxPaletteIndex
− 1), inclusive.
The variable PaletteIndexMap[ xC ][ yC ] specifies a palette index, which is an index to
the array represented by CurrentPaletteEntries. The array indices xC, yC specify the
location ( xC, yC ) of the sample relative to the top-left luma sample of the picture. The
value of PaletteIndexMap[ xC ][ yC ] shall be in the range of 0 to MaxPaletteIndex,
inclusive.
The variable adjustedRefPaletteIndex is derived as follows:
```
        adjustedRefPaletteIndex = MaxPaletteIndex + 1
        if( PaletteScanPos > 0 ) {
          xcPrev =
        x0 + TraverseScanOrder[ log2CbWidth ][ log2bHeight ][ PaletteScanPos − 1 ][ 0 ]
          ycPrev =
        y0 + TraverseScanOrder[ log2CbWidth ][ log2bHeight ][ PaletteScanPos − 1 ][ 1 ]
          if( CopyAboveIndicesFlag[ xcPrev ][ ycPrev ]  = =  0 ) {
            adjustedRefPaletteIndex = PaletteIndexMap[ xcPrev ][ ycPrev ] {          ( 1.8-3 )
          }
          else {
            if( !palette_transpose_flag )
              adjustedRefPaletteIndex = PaletteIndexMap[ xC ][ yC − 1 ]
            else
              adjustedRefPaletteIndex = PaletteIndexMap[ xC − 1 ][ yC ]
          }
        }
```
When CopyAboveIndicesFlag[ xC ][ yC ] is equal to 0, the variable CurrPaletteIndex is
derived as follows:
```
        if( CurrPaletteIndex  >=  adjustedRefPaletteIndex )
          CurrPaletteIndex++                                                        ( 1.8-4 )
```
palette_run_prefix, when present, specifies the prefix part in the binarization of
PaletteRunMinus1.

TABLE 2-continued palette_run_suffix is used in the derivation of the variable PaletteRunMinus1. When
not present, the value of palette_run_suffix is inferred to be equal to 0.
When RunToEnd is equal to 0, the variable PaletteRunMinus1 is derived as follows:
- If PaletteMaxRunMinus1 is equal to 0, PaletteRunMinus1 is set equal to 0.
- Otherwise (PaletteMaxRunMinus1 is greater than 0) the following applies:
    - If palette_run_prefix is less than 2, the following applies:
        PaletteRunMinus1 = palette_run_prefix        (1.8-5)
    - Otherwise (palette_run_prefix is greater than or equal to 2), the following
      applies:
        PrefixOffset = 1 << ( palette_run_prefix − 1 )
        PaletteRunMinus1 = PrefixOffset + palette_run_suffix    (1.8-6)
The variable PaletteRunMinus1 is used as follows:
- If CopyAboveIndicesFlag[ xC ][ yC ] is equal to 0, PaletteRunMinus1 specifies the
  number of consecutive locations minus 1 with the same palette index.
- Otherwise if palette_transpose_flag equal to 0, PaletteRunMinus1 specifies the
  number of consecutive locations minus 1 with the same palette index as used in the
  corresponding position in the row above.
- Otherwise, PaletteRunMinus1 specifies the number of consecutive locations minus
  1 with the same palette index as used in the corresponding position in the left column.
When RunToEnd is equal to 0, the variable PaletteMaxRunMinus1 represents the
maximum possible value for PaletteRunMinus1 and it is a requirement of bitstream
conformance that the value of PaletteMaxRunMinus1 shall be greater than or equal to 0.
palette_escape_val specifies the quantized escape coded sample value for a component.
The variable PaletteEscapeVal[ cIdx ][ xC ][ yC ] specifies the escape value of a sample
for which PaletteIndexMap[ xC ][ yC ] is equal to MaxPaletteIndex and
palette_escape_val_present_flag is equal to 1. The array index cIdx specifies the colour
component. The array indices xC, yC specify the location ( xC, yC ) of the sample
relative to the top-left luma sample of the picture.
It is a requirement of bitstream conformance that PaletteEscapeVal[ cIdx ][ xC ][ yC ]
shall be in the range of 0 to (1 << ( $BitDepth_Y$ + 1 ) ) − 1, inclusive, for cIdx equal to 0,
and in the range of 0 to (1 << ( $BitDepth_C$ + 1 ) ) − 1, inclusive, for cIdx not equal to 0.

Referring to Tables 1 and 2, when the palette mode is applied to the current block (i.e., the current coding unit), a palette coding syntax (e.g., palette_coding( )) as in Table 1 may be parsed/signaled.

For example, a palette table may be configured based on palette entry information. The palette entry information may include syntax elements such as palette_predictor_run, num_signalled_palette_entries, and new_palette_entries.

In addition, a palette index map for the current block may be configured based on the palette index information. The palette index information may include syntax elements such as num_palette_indices_minus1, palette_idx_idc, and palette_transpose_flag. Based on the palette index information as described above, while traversing in the traverse scan direction (vertical direction or horizontal direction) based on the palette index information as described above, a palette index (e.g., PaletteIndexIdc) may be derived for the samples in the current block to configure a palette index map (e.g., PaletteIndexMap).

In addition, a sample value for the palette entry in the palette table may be derived based on the palette index map, and restoration samples of the current block may be generated based on the sample value mapped to the palette entry.

Also, when a sample having an escape value exists in the current block (i.e., when the value of palette_escape_val_present_flag is 1), an escape value for the current block may be derived based on the escape information. The escape information may include syntax elements such as palette_escape_val_present_flag and palette_escape_val. For example, an escape value for an escape-coded sample in the current block may be derived based on quantized escape value information (e.g., palette_escape_val). Reconstructed samples of the current block may be generated based on the escape value.

In addition, as an example, the aforementioned palette mode-based coding may be described based on a syntax structure and semantics as disclosed in Tables 3 and 4 below. Procedures which are the same as or similar to those of Table 1 and Table 2 described above may be applied to processes of Table 3 and Table 4 below, so a detailed description thereof will be omitted.

Table 3 below shows an example of a syntax structure including syntax elements related to palette mode-based coding for a coding unit, and Table 4 below shows semantics for syntax elements included in the syntax of Table 3 below.

TABLE 3

| | Descriptor |
|---|---|
| palette_coding( x0, y0, cbWidth, cbHeight, treeType ) { <br>   startComp = ( treeType == DUAL_TREE_CHROMA ) ? 1 : 0 <br>   numComps = ( treeType == SINGLE_TREE ) ? ( sps_chroma_format_idc == <br> 0 ? 1 : 3 ) : ( treeType == DUAL_TREE_CHROMA ) ? 2 : 1 <br>   maxNumPaletteEntries = ( treeType == SINGLE_TREE ) ? 31 : 15 <br>   palettePredictionFinished = 0 <br>   NumPredictedPaletteEntries = 0 <br>   for( predictorEntryIdx = 0; predictorEntryIdx < PredictorPaletteSize[ startComp ] && <br>     !palettePredictionFinished && <br>     NumPredictedPaletteEntries < maxNumPaletteEntries; predictorEntryIdx++ ) { <br>     palette_predictor_run | ae(v) |
|     if( palette_predictor_run != 1 ) { <br>       if( palette_predictor_run > 1 ) | |

TABLE 3-continued

| | Descriptor |
|---|---|
| ~~~
            predictorEntryIdx += palette_predictor_run − 1
            PalettePredictorEntryReuseFlags[ predictorEntryIdx ] = 1
            NumPredictedPaletteEntries++
        } else
            palettePredictionFinished = 1
    }
    if( NumPredictedPaletteEntries < maxNumPaletteEntries )
        num_signalled_palette_entries
~~~ | ae(v) |
| ~~~
    for( cIdx = startComp; cIdx < ( startComp + numComps ); cIdx++ )
        for( i = 0; i < num_signalled_palette_entries; i++ )
            new_palette_entries[ cIdx ][ i ]
~~~ | ae(v) |
| ~~~
    if( CurrentPaletteSize[ startComp ] > 0 )
        palette_escape_val_present_flag
~~~ | ae(v) |
| ~~~
    if( MaxPaletteIndex > 0 ) {
        adjust = 0
        palette_transpose_flag
    }
~~~ | ae(v) |
| ~~~
    if( treeType != DUAL_TREE_CHROMA && palette_escape_val_present_flag )
        if( pps_cu_qp_delta_enabled_flag && !IsCuQpDeltaCoded ) {
            cu_qp_delta_abs
~~~ | ae(v) |
| ~~~
            if( cu_qp_delta_abs )
                cu_qp_delta_sign_flag
        }
~~~ | ae(v) |
| ~~~
    if( treeType != DUAL_TREE_LUMA && palette_escape_val_present_flag )
        if( sh_cu_chroma_qp_offset_enabled_flag && !IsCuChromaQpOffsetCoded ) {
            cu_chroma_qp_offset_flag
~~~ | ae(v) |
| ~~~
            if( cu_chroma_qp_offset_flag && pps_chroma_qp_offset_list_len_minus1 > 0 )
                cu_chroma_qp_offset_idx
        }
~~~ | ae(v) |
| ~~~
    PreviousRunPosition = 0
    PreviousRunType = 0
    for( subSetId = 0; subSetId <= ( cbWidth * cbHeight − 1 ) / 16; subSetId++ ) {
        minSubPos = subSetId * 16
        if( minSubPos + 16 > cbWidth * cbHeight)
            maxSubPos = cbWidth * cbHeight
        else
            maxSubPos = minSubPos + 16
        RunCopyMap[ x0 ][ y0 ] = 0
        PaletteScanPos = minSubPos
        log2CbWidth = Log2( cbWidth )
        log2CbHeight = Log2( cbHeight )
        while( PaletteScanPos < maxSubPos ) {
            xC = x0 + TraverseScanOrder[ log2CbWidth ][ log2CbHeight ][ PaletteScanPos ][ 0 ]
            yC = y0 + TraverseScanOrder[ log2CbWidth ][ log2CbHeight ][ PaletteScanPos ][ 1 ]
            if( PaletteScanPos > 0 ) {
                xcPrev = x0 + TraverseScanOrder[ log2CbWidth ][ log2CbHeight ][ PaletteScanPos − 1 ][ 0 ]
                ycPrev = y0 + TraverseScanOrder[ log2CbWidth ][ log2CbHeight ][ PaletteScanPos − 1 ][ 1 ]
            }
            if( MaxPaletteIndex > 0 && PaletteScanPos > 0 ) {
                run_copy_flag
~~~ | ae(v) |
| ~~~
                RunCopyMap[ xC ][ yC ] = run_copy_flag
            }
            CopyAboveIndicesFlag[ xC ][ yC ] = 0
            if( MaxPaletteIndex > 0 && !RunCopyMap[ xC ][ yC ] ) {
                if( ( ( !palette_transpose_flag && yC > y0 ) || ( palette_transpose_flag && xC > x0 ) ) && CopyAboveIndicesFlag[ xcPrev ][ ycPrev ] == 0 && PaletteScanPos > 0 ) {
                    copy_above_palette_indices_flag
~~~ | ae(v) |
| ~~~
                    CopyAboveIndicesFlag[ xC ][ yC ] = copy_above_palette_indices_flag
                }
                PreviousRunType = CopyAboveIndicesFlag[ xC ][ yC ]
                PreviousRunPosition = PaletteScanPos
            } else if( PaletteScanPos > 0 )
                CopyAboveIndicesFlag[ xC ][ yC ] = CopyAboveIndicesFlag[ xcPrev ][ ycPrev ]
            PaletteScanPos ++
        }
        PaletteScanPos = minSubPos
        while( PaletteScanPos < maxSubPos ) {
            xC = x0 + TraverseScanOrder[ log2CbWidth ][ log2CbHeight ][ PaletteScanPos ][ 0 ]
            yC = y0 + TraverseScanOrder[ log2CbWidth ][ log2CbHeight ][ PaletteScanPos ][ 1 ]
            if( PaletteScanPos > 0 ) {
                xcPrev =
~~~ | |

TABLE 3-continued

|  | Descriptor |
|---|---|

```
              x0 + TraverseScanOrder[ log2CbWidth ][ log2CbHeight ][ PaletteScanPos − 1 ][ 0 ]
                   ycPrev =
              y0 + TraverseScanOrder[ log2CbWidth ][ log2CbHeight ][ PaletteScanPos − 1 ][ 1 ]
            }
            if( MaxPaletteIndex > 0   &&   !RunCopyMap[ xC ][ yC ]   &&
                  CopyAboveIndicesFlag[ xC ][ yC ]   = =   0 ) {
              if( MaxPaletteIndex − adjust > 0 )
                palette_idx_idc                                                                                   ae(v)
              adjust = 1
            }
            if( !RunCopyMap[ xC ][ yC ] && CopyAboveIndicesFlag[ xC ][ yC ]   = =   0 )
              CurrPaletteIndex = palette_idx_idc
            if( CopyAboveIndicesFlag[ xC ][ yC ]   = =   0 )
              PaletteIndexMap[ xC ][ yC ] = CurrPaletteIndex
            else if( !palette_transpose_flag )
              PaletteIndexMap[ xC ][ yC ] = PaletteIndexMap[ xC ][ yC − 1 ]
            else
              PaletteIndexMap[ xC ][ yC ] = PaletteIndexMap[ xC − 1 ][ yC ]
            PaletteScanPos ++
          }
          if( palette_escape_val_present_flag ) {
            for( cIdx = startComp; cIdx < ( startComp + numComps ); cIdx++ ) {
              for( sPos = minSubPos; sPos < maxSubPos; sPos++ ) {
                xC = x0 + TraverseScanOrder[ log2CbWidth][ log2CbHeight ][ sPos ][ 0 ]
                yC = y0 + TraverseScanOrder[ log2CbWidth][ log2CbHeight ][ sPos ][ 1 ]
                if( !( treeType = = SINGLE_TREE  &&   cIdx != 0 &&
                      ( xC % SubWidthC  != 0   ||   yC % SubHeightC  != 0 ) ) ) {
                  if( PaletteIndexMap[ cIdx ][ xC ][ yC ]   = =   MaxPaletteIndex ) {
                    palette_escape_val                                                                            ae(v)
                    PaletteEscapeVal[ cIdx ][ xC ][ yC ] = palette_escape_val
                  }
                }
              }
            }
          }
        }
      }
    }
```

TABLE 4

In the following semantics, the array indices x0, y0 specify the location ( x0, y0 ) of the
top-left luma sample of the considered coding block relative to the top-left luma sample
of the picture. The array indices xC, yC specify the location ( xC, yC ) of the sample
relative to the top-left luma sample of the picture, when treeType is equal to
SINGLE_TREE or DUAL_TREE_LUMA; and relative to the top-left chroma sample of
the picture, when treeType is equal to DUAL_TREE_CHROMA. The array index
startComp specifies the first colour component of the current palette table. startComp
equal to 0 indicates the Y component; startComp equal to 1 indicates the Cb component;
startComp equal to 2 indicates the Cr component. numComps specifies the number of
colour components in the current palette table.
The predictor palette consists of palette entries from previous coding units that are used
to predict the entries in the current palette.
PredictorPaletteSize[ startComp ] specifies the size of the predictor palette for the first
colour component of the current palette table startComp.
PredictorPaletteSize[ startComp ] is derived as specified in subclause 8.4.5.3.
PalettePredictorEntryReuseFlags[ i ] equal to 1 specifies that the i-th entry in the
predictor palette is reused in the current palette. PalettePredictorEntryReuseFlags[ i ]
equal to 0 specifies that the i-th entry in the predictor palette is not an entry in the current
palette. All elements of the array PalettePredictorEntryReuseFlags[ i ] are initialized to
0.
palette_predictor_run is used to determine the number of zeros that precede a non-zero
entry in the array PalettePredictorEntryReuseFlags.
It is a requirement of bitstream conformance that the value of palette_predictor_run shall
be in the range of 0 to ( PredictorPaletteSize[ startComp ] − predictorEntryIdx ),
inclusive, where predictorEntryIdx corresponds to the current position in the array
PalettePredictorEntryReuseFlags. The variable NumPredictedPaletteEntries specifies
the number of entries in the current palette that are reused from the predictor palette. The
value of NumPredictedPaletteEntries shall be in the range of 0 to maxNumPaletteEntries,
inclusive.
num_signalled_palette_entries specifies the number of entries in the current palette
that are explicitly signalled for the first colour component of the current palette table
startComp.
When num_signalled_palette_entries is not present, it is inferred to be equal to 0.

TABLE 4-continued

The variable CurrentPaletteSize[ startComp ] specifies the size of the current palette for the first colour component of the current palette table startComp and is derived as follows:
   CurrentPaletteSize[ startComp ] = NumPredictedPaletteEntries +
   num_signalled_palette_entries    (176)
The value of CurrentPaletteSize[ startComp ] shall be in the range of 0 to maxNumPaletteEntries, inclusive.
new_palette_entries[ cIdx ][ i ] specifies the value for the i-th signalled palette entry for the colour component cIdx.
The variable LocalDualTreeFlag is derived as follows:
   LocalDualTreeFlag = ( treeType  !=  SINGLE_TREE  &&
     ( sh_slice_type  !=  I  ||  ( sh_slice_type = = I  &&
   sps_qtbtt_dual_tree_intra_flag = = 0 ) ) ) ? 1 : 0    (177)
The variable PredictorPaletteEntries[ cIdx ][ i ] specifies the i-th element in the predictor palette for the colour component cIdx.
The variable CurrentPaletteEntries[ cIdx ][ i ] specifies the i-th element in the current palette for the colour component cIdx and is derived as follows:
   numPredictedPaletteEntries = 0
   for( i = 0; i < PredictorPaletteSize[ startComp ]; i++ )
     if( PalettePredictorEntryReuseFlags[ i ] ) {
       for( cIdx = LocalDualTreeFlag ? 0 : startComp; cIdx <
LocalDualTreeFlag ? 3 :
         ( startComp + numComps ); cIdx++ )
        CurrentPaletteEntries[ cIdx ][ numPredictedPaletteEntries ] =
PredictorPaletteEntries[ cIdx ][ i ]
       numPredictedPaletteEntries++
     }
   for( cIdx = startComp; cIdx < (startComp + numComps); cIdx++)    (178)
     for( i = 0; i < num_signalled_palette_entries; i++ )
       CurrentPaletteEntries[ cIdx ][ numPredictedPaletteEntries + i ] =
   new_palette_entries[ cIdx ][ i ]
palette_escape_val_present_flag equal to 1 specifies that the current coding unit contains at least one escape coded sample. palette_escape_val_present_flag equal to 0 specifies that there are no escape coded samples in the current coding unit. When not present, the value of palette_escape_val_present_flag is inferred to be equal to 1.
The variable MaxPaletteIndex specifies the maximum possible value for a palette index for the current coding unit. The value of MaxPaletteIndex is set equal to CurrentPaletteSize[ startComp ] − 1 + palette_escape_val_present_flag.
palette_idx_idc is an indication of an index to the palette table, CurrentPaletteEntries. The value of palette_idx_idc shall be in the range of 0 to MaxPaletteIndex, inclusive, for the first index in the block and in the range of 0 to ( MaxPaletteIndex − 1 ), inclusive, for the remaining indices in the block.
When palette_idx_idc is not present, it is inferred to be equal to 0.
palette_transpose_flag equal to 1 specifies that vertical traverse scan is applied for scanning the indices for samples in the current coding unit. palette_transpose_flag equal to 0 specifies that horizontal traverse scan is applied for scanning the indices for samples in the current coding unit. When not present, the value of palette_transpose_flag is inferred to be equal to 0.
The array TraverseScanOrder specifies the scan order array for palette coding. If palette_transpose_flag is equal to 0, TraverseScanOrder is assigned the horizontal scan order HorTravScanOrder. Otherwise (palette_transpose_flag is equal to 1), TraverseScanOrder is assigned the vertical scan order VerTravScanOrder.
run_copy_flag equal to 1 specifies that the palette run type is the same as the run type at the previously scanned position and palette index is the same as the index at the previous scanned position if CopyAboveIndicesFlag[ xC ][ yC ] is equal to 0. Otherwise, run_copy_flag equal to 0 specifies that the palette run type is different from the run type at the previously scanned position.
copy_above_palette_indices_flag equal to 1 specifies that the palette index is equal to the palette index at the same location in the row above if horizontal traverse scan is used or the same location in the left column if vertical traverse scan is used.
copy_above_palette_indices_flag equal to 0 specifies that an indication of the palette index of the sample is coded in the bitstream or inferred.
The variable CopyAboveIndicesFlag[ xC ][ yC ] equal to 1 specifies that the palette index is copied from the palette index in the row above (horizontal scan) or left column (vertical scan). CopyAboveIndicesFlag[ xC ][ yC ] equal to 0 specifies that the palette index is explicitly coded in the bitstream or inferred.
The variable PaletteIndexMap[ xC ][ yC ] specifies a palette index, which is an index to the array represented by CurrentPaletteEntries. The value of
PaletteIndexMap[ xC ][ yC ] shall be in the range of 0 to MaxPaletteIndex, inclusive.
The variable adjustedRefPaletteIndex is derived as follows:
   adjustedRefPaletteIndex = MaxPaletteIndex + 1
   if( PaletteScanPos > 0 ) {
     xcPrev =
   x0 + TraverseScanOrder[ log2CbWidth ][ log2bHeight ][ PaletteScanPos − 1 ][ 0 ]
     ycPrev =
   y0 + TraverseScanOrder[ log2CbWidth ][ log2bHeight ][ PaletteScanPos − 1 ][ 1 ]
     if( CopyAboveIndicesFlag[ xcPrev ][ ycPrev ]  = =  0 )
       adjustedRefPaletteIndex = PaletteIndexMap[ xcPrev ][ ycPrev ]    (179)

TABLE 4-continued

```
    else {
      if( !palette_transpose_flag )
          adjustedRefPaletteIndex = PaletteIndexMap[ xC ][ yC − 1 ]
      else
          adjustedRefPaletteIndex = PaletteIndexMap[ xC − 1 ][ yC ]
    }
  }
When CopyAboveIndicesFlag[ xC ][ yC ] is equal to 0, the variable CurrPaletteIndex is
derived as follows:
    if( CurrPaletteIndex   >=   adjustedRefPaletteIndex )
      CurrPaletteIndex++                                                    (180)
palette_escape_val specifies the quantized escape coded sample value for a component.
The variable PaletteEscapeVal[ cIdx ][ xC ][ yC ] specifies the escape value of a sample
for which PaletteIndexMap[ xC ][ yC ] is equal to MaxPaletteIndex and
palette_escape_val_present_flag is equal to 1. The array index cIdx specifies the colour
component.
It is a requirement of bitstream conformance that PaletteEscapeVal[ cIdx ][ xC ][ yC ]
shall be in the range of 0 to (1 << BitDepth ) − 1, inclusive.
```

The present disclosure proposes a method for efficiently binarizing escape values in palette mode coding. In the palette mode, an escape value may be used to separately transmit a corresponding sample value for a sample having a value different from that of neighboring samples within a block. Since these escape values are additional data, the escape value may be efficiently coded when quantized and transmitted, rather than being transmitted as whole pixel values. In addition, in escape coding of the palette mode, a quantized escape value, to which transform is not applied, may be directly signaled. That is, the escape value may represent a quantized sample (pixel) value. Accordingly, the present disclosure proposes a method of binarizing an escape value of the palette mode by utilizing a maximum value of an escape value that may be inferred by a quantization parameter QP with respect to a block coded in the palette mode. For example, binarization may be efficiently performed by adjusting a length of a bin according to the maximum escape value or by adjusting a parameter input as an exponential Golomb.

As an embodiment, in palette mode coding, binarization may be performed on the escape value (e.g., palette_escape_val) using a fixed length code (FLC) method.

As described above, an escape value (e.g., palette_escape_val) may represent a quantized sample (pixel) value. Accordingly, when a quantization parameter is given, a maximum magnitude of an escape value (e.g., palette_escape_val) may be determined. Information on the quantization parameter may be included in video/image information and signaled from the encoding apparatus to the decoding apparatus. For example, with respect to an input image having a bit depth of 10, a magnitude of a maximum level (i.e., the maximum escape value) according to the quantization parameter QP may be represented as shown in Table 5 below. Here, for convenience of description, the QP for the current block of the Y component (luma component) will be described as an example.

TABLE 5

| QP | Max value |
|---|---|
| 0 | — |
| 1 | — |
| 2 | — |
| 3 | — |
| 4 | 1023 |
| 5 | 909 |
| 6 | 818 |
| 7 | 727 |
| 8 | 642 |
| 9 | 574 |

TABLE 5-continued

| QP | Max value |
|---|---|
| 10 | 512 |
| 11 | 455 |
| 12 | 409 |
| 13 | 364 |
| 14 | 321 |
| 15 | 287 |
| 16 | 256 |
| 17 | 227 |
| 18 | 205 |
| 19 | 182 |
| 20 | 160 |
| 21 | 144 |
| 22 | 128 |
| 23 | 114 |
| 24 | 102 |
| 25 | 91 |
| 26 | 80 |
| 27 | 72 |
| 28 | 64 |
| 29 | 57 |
| 30 | 51 |
| 31 | 45 |
| 32 | 40 |
| 33 | 36 |
| 34 | 32 |
| 35 | 28 |
| 36 | 26 |
| 37 | 23 |
| 38 | 20 |
| 39 | 18 |
| 40 | 16 |
| 41 | 14 |
| 42 | 13 |
| 43 | 11 |
| 44 | 10 |
| 45 | 9 |
| 46 | 8 |
| 47 | 7 |
| 48 | 6 |
| 49 | 6 |
| 50 | 5 |
| 51 | 4 |
| 52 | 4 |
| 53 | 4 |
| 54 | 3 |
| 55 | 3 |
| 56 | 3 |
| 57 | 2 |
| 58 | 2 |
| 59 | 2 |
| 60 | 2 |
| 61 | 1 |

TABLE 5-continued

| QP | Max value |
|---|---|
| 62 | 1 |
| 63 | 1 |

Currently in VVC, as described above, EG3 (k-th order exponential-Golomb or parameter k exponential-Golomb; where k=3) or EG5 (k-th order exponential-Golomb or EG5 (k-th order exponential-Golomb or the parameter k exponential-Golomb; where k=5) is used. Exponential Golomb binarization allocates smaller bins in small symbols, and the number of bins increases as the value increases. In addition, it is known that as the parameter k increases, the number of bins, which increases as the size of a symbol increases, is advantageous compared to a lower order. As shown in Table 5 above, this EGk binarization method may be advantageous because the number of bins to be expressed is small when the QP is high (a large value). However, escape values (e.g., palette_escape_val) may represent symbols ranging from 0 to (1<<BitDepth)−1 at the maximum, and when the QP is low, the EGk method may be disadvantageous. That is, binarization of the current escape value (e.g., palette_escape_val) is not optimal in all cases. For example, as shown in Table 5 above, when palette mode coding is performed in QP 4 and the escape value is 1023, when EG3 binarization is performed on this symbol, 18 bins are required, but it may be expressed only with 10 bins in the fixed length (FL) method. Accordingly, in the present embodiment, when binarizing is performed on an escape value (e.g., palette_escape_val), binarization may be performed based on a fixed length code (FLC) method.

As a quantization characteristic, when the size of the QP increases by 6, the data that may be represented is reduced by half. As shown in Table 5 above, the magnitude of the maximum data is reduced by ½ for every increase of 6 based on QP 4. Since a QP value is given for a current CU on which palette mode coding is performed, a maximum value that may occur may be inferred, and the maximum value may be utilized as an input of the fixed length binarization method, thereby enabling efficient binarization.

That is, as an example, the syntax element palette_escape_val representing the quantized escape value may be subjected to the fixed length coding-based binarization process as shown in Tables 6 and 7 below.

Table 6 below shows an example of palette coding syntax elements and a binarization method corresponding thereto.

TABLE 6

| Syntax structure | Syntax element | Binarization | |
|---|---|---|---|
| | | Process | Input parameters |
| palette_coding( ) | palette_predictor_run | EG0 | — |
| | num_signalled_palette_entries | EG0 | — |
| | new_palette_entries | FL | cMax = cIdx = = 0 ? ( ( 1 << $BitDepth_Y$ ) 1 ) : ( (1 << $BitDepth_C$ ) − 1 ) |
| | palette_escape_val_present_flag | FL | cMax = 1 |
| | num_palette_indices_minus1 | 1.8.6.1 | MaxPaletteIndex |
| | palette_idx_idc | 1.8.6.2 | MaxPaletteIndex |
| | copy_above_indices_for_final_run_flag | FL | cMax = 1 |
| | palette_transpose_flag | FL | cMax = 1 |
| | copy_above_palette_indices_flag | FL | cMax = 1 |
| | palette_run_prefix | TR | cMax = Floor( Log2( PaletteMaxRunMinus1 ) ) + 1, cRiceParam = 0 |
| | palette_run_suffix | TB | cMax = ( PrefixOffset << 1 ) > PaletteMaxRunMinus1 ? ( PalletMaxRun − PrefixOffset ) : ( PrefixOffset − 1 ) |
| | palette_escape_val | escCode | — |

Referring to Table 6, the syntax element palette_escape_val representing the quantized escape value may be encoded/decoded by applying the binarization method (escCode disclosed in Table 7) proposed in this embodiment.

Table 7 below is an example of a pseudo code (escCode) indicating a fixed-length coding-based binarization process for the syntax element palette_escape_val indicating a quantized escape value.

TABLE 7

Input to this process is a request for a binarization for the syntax element palette escape val, cu transquant bypass flag and colour component index cIdx.
Output of this process is the binarization of the syntax element.
The variable bitDepth is derived as follows :
  bitDepth = BitDepth
  The following ordered steps apply :
    1. The variable QP is derived as follows:
      qPTemp − (cIdx − − 0)? $Qp'_Y$ : (cIdx − − 1 ) ? $Qp'_{Cb}$ : $Qp'_{Cr}$
      QP = Max ( 4+QpPrimeTsMin, qPTemp ) or QP = Max ( 4, qPTemp )
    2. The variable binLength is derived as follows:
      binLength = bitDepth − ( Max( 0, QP − 5 ) / 6 )
    3. The variable cMax is derived as follows:
      cMax = Clip( 0, ( 1 << bitDepth ) − 1 , ( 1 << binLength ) − 1 )
The binarization for the palette_escape_val is derived by invoking the FL binarization process with symbolVal and cMax.

Referring to Table 7, when a syntax element palette_escape_val representing a quantized escape value is input, a binarized value of palette_escape_val may be output based on FL coding. For example, a quantization parameter QP may be derived first, and in this case, the quantization parameter QP may be derived based on a minimum quantization parameter (e.g., QpPrimeTsMin) for the transform skip mode and quantization parameter Qp (Qp'Y for luma component, Qp'Cb for chroma component). In addition, a bin length (e.g., binLength) may be derived based on the bit depth and the quantization parameter QP. A maximum value (e.g., cMax) may be derived based on the bin length (e.g., binLength) and the bit depth. That is, FL binarization may be performed on palette_escape_val based on the maximum value (e.g., cMax).

As an example, the FL binarization process for palette_escape_val with a maximum value (e.g., cMax) as an input may be performed as shown in Table 8 below. Table 8 is an example of an algorithm showing a schematic operation of the FL binarization process.

TABLE 8

1.3.3 Fixed-length binarization process

Inputs to this process are a request for a fixed-length (FL) binarization and cMax.
Output of this process is the FL binarization associating each value symbolVal with a corresponding bin string.
FL binarization is constructed by using the fixedLength-bit unsigned integer bin string of the symbol value symbolVal, where fixedLength = Ceil( Log2( cMax + 1 ) ). The indexing of bins for the FL binarization is such that the binIdx = 0 relates to the most significant bit with increasing values of binIdx towards the least significant bit.

Using the method according to the embodiment described above, the number of bins may be adjusted according to the maximum available value (that is, the maximum value that may represent the quantized escape value), and thus, coding may be efficiently performed. Also, the encoding apparatus may generate/binarize/encode palette_escape_val in the same manner as above based on the palette mode applied to the current block. When bins corresponding to one of the candidate bin strings of palette_escape_val are parsed, while sequentially parsing bits/bins from the bitstream, the decoding apparatus may derive a value indicated by the corresponding bins as the value of palette_escape_val. As described above, the decoding apparatus may perform palette mode-based coding (block prediction/restoration) based on the value of palette_escape_val.

In addition, as an embodiment, in palette mode coding, binarization may be performed on an escape value (e.g., palette_escape_val) using a truncated binary code (TBC) method.

As described above, in the current VVC, EG3 (k-th order exponential-Golomb or parameter k exponential-Golomb; where k=3) or EG5 (k-th order exponential-Golomb or parameter k exponential-Golomb; where k=5) is used. As described above. However, escape values (e.g., palette_escape_val) may represent symbols ranging from 0 to (1<<BitDepth)−1 at the maximum, and when the QP is low, the EGk method may be disadvantageous. That is, binarization of the current escape value (e.g., palette_escape_val) is not optimal in all cases. Therefore, in the present embodiment, when binarizing an escape value (e.g., palette_escape_val), binarization may be performed based on the truncated binary code (TBC) method.

In addition, since the QP value is given for the current CU in which the palette mode coding is performed, the maximum value that may occur may be inferred and utilized as an input of a truncated binary (TB) binarization method, thereby enabling efficient binarization.

In the case of TBC, binarization is determined by the value of the input symbol and the number of input symbols. For example, when a total of u input symbols are possible, in the truncated binary code, the first l symbols are coded using k bits and the remaining u−l symbols are coded using k+1 bits. Here, the value of k and l may be determined as in Equation 1 below.

$$k = \text{floor}(\text{Log }2(u))$$

$$l = 2^{k+1} - u \qquad [\text{Equation 1}]$$

Table 9 below is an example showing how a relationship between the values u, k, and l disclosed above is defined in TBC.

TABLE 9

| Total number of symbols u | k bit to code symbols first l symbols | First l symbols |
|---|---|---|
| 29 | 4 | 3 |
| 61 | 5 | 3 |
| 62 | 5 | 2 |

Table 10 below shows an example of TBC binarization when the number of input symbols is 61 (u=61).

TABLE 10

| Input symbols | Mapped value | binary | Number of bits use to code |
|---|---|---|---|
| 0 | 0 | 00000 | 5 |
| 1 | 1 | 00001 | 5 |
| 2 | 2 | 00010 | 5 |
| 3 | 6 | 000110 | 6 |
| 4 | 7 | 000111 | 6 |
| 5 | 8 | 001000 | 6 |
| ... | ... | | ... |
| 60 | 63 | 111111 | 6 |

That is, as an example, the truncated binary coding-based binarization process may be performed on the syntax element palette_escape_val representing the quantized escape value as shown in Table 11 and Table 12 below.

Table 11 below shows an example of palette coding syntax elements and a binarization method corresponding thereto.

TABLE 11

| Syntax structure | Syntax element | Binarization | |
|---|---|---|---|
| | | Process | Input parameters |
| palette_coding( ) | palette_predictor_run | EG0 | — |
| | num_signalled_palette_entries | EG0 | — |
| | new_palette_entries | FL | cMax = cIdx = = 0 ? ( ( 1 << $BitDepth_Y$ ) − 1 ) : ( (1 << $BitDepth_C$ ) − 1 ) |
| | palette_escape_val_present_flag | FL | cMax = 1 |
| | num_palette_indices_minus1 | 1.8.6.1 | MaxPaletteIndex |
| | palette_idx_idc | 1.8.6.2 | MaxPaletteIndex |
| | copy_above_indices_for_final_run_flag | FL | cMax = 1 |
| | palette_transpose_flag | FL | cMax = 1 |
| | copy_above_palette_indices_flag | FL | cMax = 1 |
| | palette_run_prefix | TR | cMax = Floor( Log2( PaletteMaxRunMinus1 ) ) + 1, cRiceParam = 0 |
| | palette_run_suffix | TB | cMax = ( PrefixOffset << 1 ) > PaletteMaxRunMinus1 ? ( PalletMaxRun − PrefixOffset ) : ( PrefixOffset − 1 ) |
| | palette_escape_val | escCode | — |

Referring to Table 11 above, when the syntax element palette_escape_val representing the quantized escape value using the characteristics of TBC binarization as described above is encoded, assuming that the maximum available value is cMax, palette_escape_val may be binarized as shown in Table 12 below. Here, since the input symbols are quantized values and are distributed as 0, 1, 2, . . . , cMax as non-negative integer values, the number of input symbols is cMax+1.

Table 12 below is an example of a pseudo code (escCode) indicating a truncated binary coding-based binarization process for the syntax element palette_escape_val indicating a quantized escape value.

TABLE 12

Input to this process is a request for a binarization for the syntax element palette_escape_val, cu_transquant_bypass_flag and colour component index cIdx.
  Output of this process is the binarization of the syntax element.
  The variable bitDepth is derived as follows :
    bitDepth = BitDepth
  The following ordered steps apply :
    1. The variable QP is derived as follows:
      qPTemp = (cIdx = = 0)? Qp'Y : (cIdx = = 1 ) ? Qp'Cb : Qp'Cr
      QP = Max ( 4+QpPrimeTsMin, qPTemp ) or QP = Max ( 4, qPTemp )
    2. The variable quantScale[ ] is derived as follows:
      quantScale[ k ] = { 26214, 23302, 20560, 18396, 16384, 14564 } with k = 0, ... , 5
    3. The variable qBits and qRem are derived as follows:
      qBits = 14 | ( QP / 6 )
      qRem = QP % 6
    4. The variable maxValue is derived as follows:
      maxValue = ( 1 << bitDepth ) − 1
    5. The variable cMax is derived as follows:
      cMax = Clip( 0, ( 1 << bitDepth ) 1 , ( quantScale[ qRem ] * maxValue
        + ( 1 << ( qBits − 1 ) ) ) >> qBits
  The binarization for the palette_escape_val is derived by invoking the TB
binarization process with symbolVal and cMax.

Referring to Table 12, when a syntax element palette_escape_val representing a quantized escape value is input, a binarized value of palette_escape_val may be output based on TB coding. For example, a quantization parameter QP may be derived first, and in this case, the quantization parameter QP may be derived based on a minimum quantization parameter (e.g., QpPrimeTsMin) and quantization parameter Qp (Qp'Y for luma component, Qp' Cb or Qp' Cr for chroma component) for the transform skip mode. Also, a quantization scale (e.g., quanScale) may be derived, and variables qBits and qRem may be derived based on the quantization parameter QP. Also, a maximum value (e.g., cMax) may be derived based on the derived quantization scale (e.g., quantScale), variables qBits and qRem, maxValue, and bit depth. That is, TB binarization of palette_escape_val may be performed based on the maximum value (e.g., cMax).

For example, the TB binarization process for palette_escape_val with the maximum value (e.g., cMax) as an input may be performed as shown in Table 13 below. Table 13 is an example of an algorithm showing a schematic operation of the TB binarization process.

TABLE 13

1.3.4 Truncated Binary (TB) binarization process

Input to this process is a request for a TB binarization for a syntax element with value synVal and cMax. Output of this process is the TB binarization of the syntax element. The bin string of the TB binarization process of a syntax element synVal is specified as follows:
  n = cMax + 1
  k = Floor( Log2( n ) )    ( 1.3 19 )
  u = ( 1   <<   ( k + 1 ) ) − n
- If synVal is less than u, the TB bin string is derived by invoking the FL binarization process specified in clause 1.3.7 for synVal with a cMax value equal to ( 1   <<   k ) − 1.
- Otherwise (synVal is greater than or equal to u), the TB bin string is derived by invoking the FL binarization process specified in clause 1.3.7 for ( synVal + u ) with a cMax value equal to ( 1   <<   ( k + 1 ) ) − 1.

In the case of binarization using TB according to the embodiment described above, unlike FL binarization, coding is possible with fewer bits in some symbols, so that binarization may be performed more efficiently than the conventional method. Also, the encoding apparatus may generate/binarize/encode palette_escape_val in the same manner as described above based on the palette mode applied to the current block. When bins corresponding to one of the candidate bin strings of palette_escape_val are parsed, while sequentially parsing bits/bins from the bitstream, the decoding apparatus may derive a value indicated by the corresponding bins as the value of palette_escape_val. As described above, the decoding apparatus may perform palette mode-based coding (block prediction/restoration) based on the value of palette_escape_val.

In addition, as an embodiment, binarization may be performed by determining a parameter k of Exponential Golomb Code for an escape value (e.g., palette_escape_val) in palette mode coding.

As described above, in the current VVC, EG3 (k-th order exponential-Golomb or parameter k exponential-Golomb; where k=3) or EG5 (k-th order exponential-Golomb or parameter k exponential-Golomb; where k=5) is used for binarization of the escape value (e.g., palette_escape_val). However, the escape value (e.g., palette_escape_val) may represent symbols ranging from 0 to (1<<BitDepth)−1 at the maximum, and when the QP is low, the EGk method may be disadvantageous. That is, binarization of the current escape value (e.g., palette_escape_val) is not optimal in all cases. Therefore, in the present embodiment, when binarization is performed on an escape value (e.g., palette_escape_val), binarization may be performed by determining a parameter k of the EG (Exponential Golomb Code) according to the maximum value determined by the quantization parameter QP.

In addition, since the QP value is given for the current CU in which the palette mode coding is performed, the maximum value that may occur may be inferred. For example, if it is assumed that the QP of the block to be currently coded is 45, the maximum value may be calculated as 9 as shown in Table 3 (the maximum value calculation method is the same as cMax of the escCode of Table 9). That is, the symbols to be expressed are from 0 to 9, and in the worst case (symbol=9), it may be expressed with 6 bins. However, when k is 4, since it may be expressed as 5 bins in the worst case, more efficient binarization is possible than when the parameter k=3 is used.

For example, when the smallest bit capable of expressing a quantized maximum value is n, k may be n+1. As another example, k may be determined based on a predefined threshold according to the size of a specific maximum value. In addition, it may be said that the method of determining the parameter k of the EG using the maximum value inferred from the QP is consistent with the method proposed in the present embodiment.

As an example, the FL binarization process for palette_escape_val may be performed as shown in Table 14 below. Table 14 is an example of an algorithm showing a schematic operation of the EGk (k-th order Exp-Golomb) binarization process.

TABLE 14

1.3.5 k-th order Exp-Golomb binarization process

Inputs to this process is a request for a k-th order Exp-Golomb (EGk) binarization.
Output of this process is the EGk binarization associating each value symbolVal with a corresponding bin string.
The bin string of the EGk binarization process for each value symbolVal is specified as follows, where each call of the function put( X ), with X being equal to 0 or 1, adds the binary value X at the end of the bin string:
  absV = Abs( symbolVal )
  stopLoop = 0
  do
    if( absV   >=   ( 1   <<   k ) ) {
      put( 1 )
      absV = absV − ( 1   <<   k )
      k++
        ( 1.3-20 )
    } else {
      put( 0 )
      while( k− − )
        put( ( absV   >>   k ) & 1 )
      stopLoop = 1
    }
  while( !stopLoop )

According to the binarization method according to the embodiment described above, information on the quantized escape value (e.g., palette_escape_val syntax element) may be encoded/decoded. The encoding apparatus may generate/ binarize/encode palette_escape_val in the same manner as described above based on the palette mode applied to the current block. When bins corresponding to one of the candidate bin strings of palette_escape_val are parsed, while sequentially parsing bits/bins from the bitstream, the decoding apparatus may derive a value indicated by the corresponding bins as the value of palette_escape_val. As described above, the decoding apparatus may perform palette mode-based coding (block prediction/restoration) based on the value of palette_escape_val.

The following drawings were created to explain a specific example of the present disclosure. The names of specific devices described in the drawings or specific terms or names (e.g., names of syntax/syntax elements, etc.) are provided by way of example, so that the technical features of the present disclosure are not limited to the specific names used in the drawings below.

Figure 12:
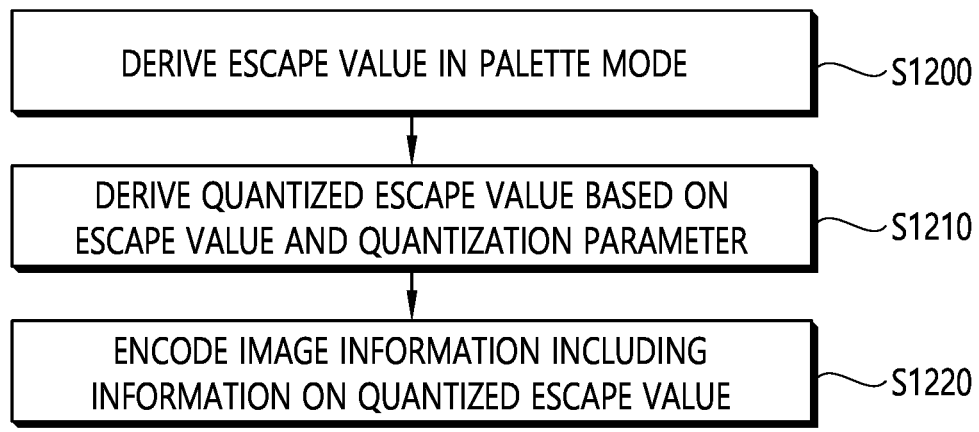
FIG. 12 schematically illustrates an example of a video/image encoding method according to embodiment(s) of the present disclosure.

FIG. 12 schematically illustrates an example of a video/ image encoding method according to embodiment(s) of the present disclosure.

The method disclosed in FIG. 12 may be performed by the encoding apparatus 200 illustrated in FIG. 2. Specifically, steps S1200 to S1210 of FIG. 12 may be performed by the predictor 220 illustrated in FIG. 2, and operation S1220 of FIG. 12 may be performed by the entropy encoder 240 illustrated in FIG. 2. In addition, the method disclosed in FIG. 12 may be performed including the embodiments described above in the present disclosure. Accordingly, in FIG. 12, a detailed description of the content overlapping with the embodiments described above will be omitted or simplified.

Referring to FIG. 12, the encoding apparatus may derive an escape value in the palette mode for the current block (S1200).

As an embodiment, the encoding apparatus may determine a prediction mode for the current block and perform prediction. For example, the encoding apparatus may determine whether to perform inter prediction or intra prediction on the current block. Alternatively, the encoding apparatus may determine whether to perform prediction on the current block based on CIIP mode, IBC mode, or palette mode. The encoding apparatus may determine a prediction mode based on RD cost. The encoding apparatus may derive prediction samples for the current block by performing prediction according to the determined prediction mode. Also, the encoding apparatus may generate and encode information related to prediction (e.g., prediction mode information) applied to the current block.

When performing palette mode-based prediction on the current block, the encoding apparatus may apply the palette mode coding disclosed in the embodiments described above. That is, the encoding apparatus may derive a palette entry, a palette index, an escape value, and the like by applying the palette mode coding to the current block.

As an example, the encoding apparatus may generate palette entry information based on sample values of the current block. That is, the encoding apparatus may derive the palette predictor entry and palette entry reuse information used in the block coded in the previous palette mode to configure the palette table, and may derive the palette entry for the current block. For example, as disclosed in Tables 1 to 4 above, the encoding apparatus may derive palette entry information such as palette_predictor_run, num_signalled_palette_entries, new_palette_entries, etc. used to configure the palette table (i.e., palette entry).

In addition, the encoding apparatus may generate palette index information for the current block based on the palette entry information. That is, the encoding apparatus may derive the palette index of each sample and configure the palette index map, while traversing the samples of the current block in the traverse scan direction (vertical direction or horizontal direction), For example, as disclosed in Tables 1 to 4, the encoding apparatus may derive palette entry information such as palette_transpose_flag, palette_idx_idc, copy_above_indices_for_final_run_flag, num_palette_indices_minus1 used to configure the palette index map.

Here, the palette table includes representative sample values (palette entries) for samples in the current block and may include a palette index corresponding to each sample value. That is, the encoding apparatus may derive a palette index corresponding to an entry (pixel value) in the palette table for each sample in the current block, thereby signaling the palette index to the decoding apparatus.

The encoding apparatus may encode image information including the palette entry information and the palette index information, and signal the encoded image information to the decoding apparatus.

In addition, in performing palette mode-based prediction on the current block, the encoding apparatus may derive an escape value for the current block including at least one escape-coded sample.

As described above, since it is effective in terms of coding efficiency to separately transmit a corresponding sample value for a sample having a value different from that of neighboring samples in the current block in the palette mode, this sample value may be signaled as an escape value. In this case, since the escape value is additional data, quantization may be performed to save it. In addition, no transform is applied to the escape value of the palette mode, and the quantized value may be directly signaled.

The encoding apparatus may derive a quantized escape value based on the escape value and the quantization parameter (S1210).

As an embodiment, the encoding apparatus may derive a quantized escape value by applying it to the escape value based on a quantization parameter for the escape value.

For example, the quantization parameter may be derived based on minimum quantization parameter information for the transform skip mode. The minimum quantization parameter information for the transform skip mode may be represented by, for example, a min_qp_prime_ts_minus4 syntax element, and the minimum quantization parameter (e.g., QpPrimeTsMin disclosed in Table 7 or Table 12) may be derived based on the value of the min_qp_prime_ts_minus4 syntax element. Or, for example, the quantization parameter may be derived based on the quantization parameter Qp'Y for a luma component and the parameter Qp'Cb or Qp'Cr for a chroma component. Or, for example, the quantization parameter may be derived based on the minimum quantization parameter information for the transform skip mode (e.g., QpPrimeTsMin) and the quantization parameter (Qp'Y, Qp'Cb or Qp'Cr) for the luma/chroma component.

The encoding apparatus may derive a quantized escape value by applying the quantization parameter in the palette mode derived as described above. The encoding apparatus may generate the quantized escape value as a palette_escape_val syntax element as disclosed in Tables 1 to 4 above, and signal it. That is, the encoding apparatus may generate and signal information on the quantized escape value (e.g., palette_escape_val) for the current block including at least one escape-coded sample. In other words, the information on the quantized escape value may be a syntax element for the quantized escape value of the escape-coded sample in the current block.

Also, according to an embodiment, the encoding apparatus may generate information for indicating that a sample having an escape value exists in the current block, and may signal the information. For example, the information for indicating whether a sample having an escape value exists in the current block may be represented by the palette_escape_val_present_flag syntax element shown in Tables 1 to 4 above.

The encoding apparatus may encode image information (or video information) (S1220). Here, the image information may include various information used for the palette mode coding described above.

As an embodiment, the encoding apparatus may generate and encode image information including information on quantized escape values. In this case, the quantized escape value may be generated for the current block including at least one escape-coded sample.

In addition, the encoding apparatus may generate and encode image information including palette entry information and palette index information. Also, the encoding apparatus may generate and encode image information including information on a quantization parameter. In this case, the information on the quantization parameter may be the minimum quantization parameter information for the transform skip mode as described above.

In encoding the information on the quantized escape value, the encoding apparatus may perform a binarization process. The binarization process may be performed based on a maximum value of information on the quantized escape value. In this case, the maximum value may be derived based on the quantization parameter described above.

As an embodiment, the encoding apparatus may perform a truncated binary (TB) binarization process on the information on the quantized escape value. In this case, the TB binarization process may be performed as in the embodiment disclosed in Table 9 to Table 13 above.

For example, the encoding apparatus may perform TB binarization on the information on the quantized escape value based on the maximum value. The information on the quantized escape value may have a symbol value ranging from 0 to a maximum value, and in this case, the maximum value may represent the variable cMax described above. For example, in TB binarization for information on quantized escape value, first u symbols may be indicated based on k bits (or binarization codeword) and remaining (cMax−u+1) symbols may be indicated based on (k+1) bits (or binarization codeword). Here, k and l may be calculated as disclosed in Equation 1 above. That is, cMax represents the maximum value, k represents an integer satisfying $2^k \leq cMax < 2^{k+1}$ and u may be derived based on $2^{k+1}-(cMax+1)$.

Also, for example, in TB binarization, the maximum value (e.g., cMax) may be derived based on Clip(0, (1<<bitDepth)−1, (quantScale[qRem]*maxValue+(1<<(qBits−1)))>>qBits as described above. Here, bitDepth is the bit depth, quantScale is an array including k scale values, maxValue is derived based on (1<<bitDepth)−1, qRem is derived based on QP % 6, qBits is derived based on 14+(QP/6), and QP may refer to the quantization parameter. Specific examples thereof may be as disclosed in Table 9 to Table 13 above.

Alternatively, as an embodiment, the encoding apparatus may perform fixed length (FL) binarization on the information on the quantized escape value. In this case, the FL binarization process may be performed as in the embodiment disclosed in Table 5 to Table 8 above.

For example, the encoding apparatus may perform FL binarization on the information on the quantized escape value based on the maximum value. In FL binarization, the maximum value (e.g., cMax) may be derived based on Clip(0, (1<<bitDepth)−1, (1<<binLength)−1) as described above. Here, bitDepth is the bit depth, binLength is derived based on bitDepth−(Max(0, QP−5)/6), and QP may refer to the quantization parameter. Specific examples thereof may be as disclosed in Table 5 to Table 8 above.

Alternatively, as an embodiment, the encoding apparatus may perform k-th order Exp-Golomb (EG) binarization on the information on the quantized escape value. In this case, the k-order EG (EGk) binarization process may be performed as in the embodiment disclosed in Table 14 above.

For example, the encoding apparatus may perform EG binarization by variably determining the k order (i.e., parameter k) based on the maximum value in k order EG (EGk) binarization. For example, when a minimum bit capable of expressing the maximum value of the quantized escape value is n, the parameter k (order k) may be (n+1). Alternatively, the parameter k (order k) may be determined based on a predefined threshold for the maximum value of the quantized escape value.

Image information including various information as described above may be encoded and output in the form of a bitstream. The bitstream may be transmitted to the decoding apparatus via a network or (digital) storage medium. Here, the network may include a broadcasting network and/or a communication network, and the digital storage medium may include various storage mediums such as USB, SD, CD, DVD, Blu-ray, HDD, and SSD.

Figure 13:
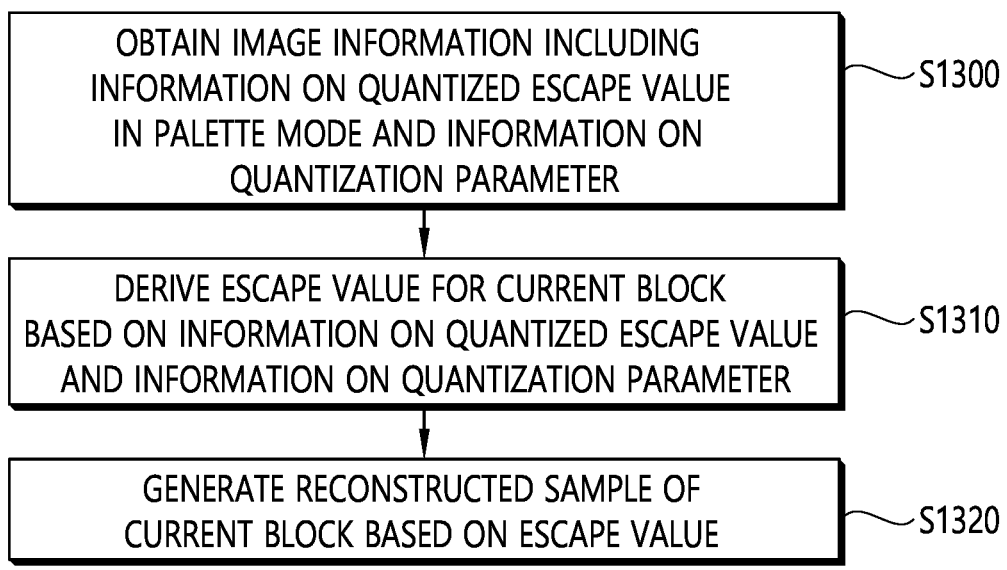
FIG. 13 schematically illustrates an example of a video/image decoding method according to embodiment(s) of the present disclosure.

FIG. 13 schematically illustrates an example of a video/image decoding method according to embodiment(s) of the present disclosure.

The method disclosed in FIG. 13 may be performed by the decoding apparatus 300 illustrated in FIG. 3. Specifically, step S1300 of FIG. 13 may be performed by the entropy decoder 310 illustrated in FIG. 3, and steps S1310 to S1320 of FIG. 13 may be performed by the predictor 330 illustrated in FIG. 3. Also, the method disclosed in FIG. 13 may be performed including the embodiments described above in the present disclosure. Accordingly, in FIG. 13, a detailed description of content overlapping with the above-described embodiments will be omitted or simplified.

Referring to FIG. 13, the decoding apparatus may receive image information (or video information) from a bitstream (S1300).

The decoding apparatus may parse the bitstream to derive information (e.g., video/image information) required for image restoration (or picture restoration). In this case, the image information may include information related to prediction (e.g., prediction mode information). In addition, the image information may include various information used for the palette mode coding described above. For example, the image information may include information on quantized escape values, palette entry information, palette index information, minimum quantization parameter information for a transform skip mode, and the like. That is, the image information may include various information required in the decoding process, and may be decoded based on a coding method such as exponential Golomb coding, CAVLC, or CABAC.

As an embodiment, the decoding apparatus may obtain image information including information on a quantization parameter and information on a quantized escape value in a palette mode from a bitstream.

For example, the information on the quantized escape value may indicate a syntax element for the quantized escape value of an escape-coded sample in the current block, and as disclosed in Tables 1 to 4 above, it may be a palette_escape_val syntax element. In this case, information on the quantized escape value (e.g., palette_escape_val) may be obtained based on information indicating whether a sample having an escape value exists in the current block (e.g., palette_escape_val_present_flag). For example, when a sample having an escape value exists in the current block (that is, when the value of palette_escape_val_present_flag is 1), the decoding apparatus may obtain quantized escape value information (e.g., palette_escape_val) from the bitstream. That is, the decoding apparatus may derive quantized escape values by obtaining quantized escape value information for the current block including at least one escape-coded sample.

Also, for example, the information on the quantization parameter may be the minimum quantization parameter information for the transform skip mode. Minimum quantization parameter information for the transform skip mode may be represented by, for example, a min_qp_prime_ts_minus4 syntax element.

Meanwhile, in obtaining information on the quantized escape value, the decoding apparatus may perform a binarization process. The binarization process may be performed based on the maximum value of information on the quantized escape value. In this case, the maximum value may be derived based on the quantization parameter derived from the information on the quantization parameter described above.

For example, the quantization parameter may be derived based on minimum quantization parameter information for the transform skip mode (e.g., min_qp_prime_ts_minus4 syntax element). In this case, as for the quantization parameter, a minimum quantization parameter (e.g., QpPrimeTsMin disclosed in Table 7 or Table 12) may be derived based on the value of the min_qp_prime_ts_minus4 syntax element, and the quantization parameter for the escape value may be derived based on the minimum quantization parameter (e.g., QpPrimeTsMin). Or, for example, the quantization parameter may be derived based on the quantization parameter Qp'Y for the luma component and the parameter Qp'Cb or Qp'Cr for the chroma component. Or, for example, the quantization parameter may be derived based on the minimum quantization parameter information (e.g., QpPrimeTsMin) for the transform skip mode and the quantization parameter (Qp'Y, Qp'Cb or Qp'Cr) for the luma/chroma component.

As an embodiment, the decoding apparatus may perform a truncated binary (TB) binarization process on information on quantized escape values. In this case, the TB binarization process may be performed as in the embodiment disclosed in Table 9 to Table 13 above.

For example, the decoding apparatus may perform TB binarization on the information on the quantized escape value based on the maximum value. The information on the quantized escape value may have a symbol value ranging from 0 to a maximum value, and in this case, the maximum value may represent the variable cMax described above. For example, in TB binarization for information on quantized escape value, first u symbols may be indicated based on k bits (or binarization codeword) and remaining (cMax−u+1) symbols may be indicated based on (k+1) bits (or binarization codeword). Here, k and l may be calculated as disclosed in Equation 1 above. That is, cMax represents the maximum value, k represents an integer satisfying $2^k \leq cMax < 2^{k+1}$ and u may be derived based on $2^{k+1}-(cMax+1)$.

Also, for example, in TB binarization, the maximum value (e.g., cMax) may be derived based on Clip (0, (1<<bitDepth)−1, (quantScale[qRem]*maxValue+(1<<(qBits−1)))>>qBits as described above. Here, bitDepth is the bit depth, quantScale is an array including k scale values, maxValue is derived based on (1<<bitDepth)−1, qRem is derived based on QP % 6, qBits is derived based on 14+(QP/6), and QP may refer to the quantization parameter. Specific examples thereof may be as disclosed in Table 9 to Table 13 above.

Alternatively, as an embodiment, the decoding apparatus may perform fixed length (FL) binarization on the information on the quantized escape value. In this case, the FL binarization process may be performed as in the embodiment disclosed in Table 5 to Table 8 above.

For example, the decoding apparatus may perform FL binarization on the information on the quantized escape value based on the maximum value. In FL binarization, the maximum value (e.g., cMax) may be derived based on Clip(0, (1<<bitDepth)−1, (1<<binLength)−1) as described above. Here, bitDepth is the bit depth, binLength is derived based on bitDepth−(Max(0, QP−5)/6), and QP may refer to the quantization parameter. Specific examples thereof may be as disclosed in Table 5 to Table 8 above.

Alternatively, as an embodiment, the decoding apparatus may perform k-th order Exp-Golomb (EG) binarization on the information on the quantized escape value. In this case, the k-order EG (EGk) binarization process may be performed as in the embodiment disclosed in Table 14 above.

For example, the decoding apparatus may perform EG binarization by variably determining the k order (i.e., parameter k) based on the maximum value in k order EG (EGk) binarization. For example, when a minimum bit capable of expressing the maximum value of the quantized escape value is n, the parameter k (order k) may be (n+1). Alternatively, the parameter k (order k) may be determined based on a predefined threshold for the maximum value of the quantized escape value.

The decoding apparatus may derive an escape value for the current block based on the information on the quantized escape value and the information on the quantization parameter (S1310).

As an embodiment, the decoding apparatus may derive the escape value by performing dequantization (scaling process) on the quantized escape value based on the quantization parameter. That is, the decoding apparatus may derive the quantized escape value from the information on the quantized escape value through the binarization process as described above, and derive the quantization parameter from the information on the quantization parameter as described above. In addition, the decoding apparatus may derive an escape value for an escape-coded sample in the current block by dequantizing the quantized escape value by applying a quantization parameter.

The decoding apparatus may generate a reconstructed sample of the current block based on the escape value (S1320).

As an embodiment, the decoding apparatus may generate reconstructed sample(s) based on an escape value with respect to the current block including at least one escape-coded sample. For example, if there is a sample having an escape value in the current block (e.g., when the value of palette_escape_val_present_flag is 1), the decoding apparatus may derive the escape value as described above to generate a reconstructed sample of the escape-coded sample.

In addition, in performing palette mode-based prediction on the current block (that is, when the palette mode is applied to the current block), the decoding apparatus may obtain image information including palette entry information and palette index information for samples other than escape-coded samples in the current block, and generate reconstructed samples based on the obtained image information.

As an example, the decoding apparatus may configure a palette table for the current block based on the palette entry information. For example, the palette entry information may include palette_predictor_run, num_signalled_palette_entries, new_palette_entries, and the like, as disclosed in Table 1 to Table 4 above. That is, in order to configure the palette table, the decoding apparatus may derive a palette predictor entry and palette entry reuse information used in the block coded in the previous palette mode, and derive the palette entry for the current block. Also, the decoding apparatus may construct a palette table based on the previous palette predictor entry and the current palette entry.

In addition, the decoding apparatus may configure a palette index map for the current block based on the palette index information. For example, the palette index information may include palette_transpose_flag, palette_idx_idc, copy_above_indices_for_final_run_flag, num_palette_indices_minus1, etc. used to configure the palette index map as disclosed in Table 1 to Table 4 above. That is, the decoding apparatus may configure the palette index map (e.g., PaletteIndexMap) based on information (e.g., palette_idx_idc) indicating a palette index of each sample, while traversing the samples of the current block based on information (e.g., palette_transpose_flag) indicating a traverse scan direction (vertical direction or horizontal direction).

In addition, the decoding apparatus may derive a sample value for the palette entry in the palette table based on the palette index map. Also, the decoding apparatus may generate reconstructed samples based on the sample value for the palette index map and the palette entry.

Here, the palette table may include representative sample values (palette entries) for samples in the current block, and may include a palette index corresponding to each sample value. Accordingly, the decoding apparatus may derive the sample value of the entry in the palette table corresponding to the index of the palette index map, and generate it as a reconstructed sample value of the current block.

In the exemplary system described above, methods are described according to a flow diagram by using a series of steps and blocks. However, the present disclosure is not limited to a specific order of the steps, and some steps may be performed with different steps and in a different order from those described above or simultaneously. Also, it should be understood by those skilled in the art that the steps shown in the flow diagram are not exclusive, other steps may be further included, or one or more steps of the flow diagram may be deleted without influencing the technical scope of the present disclosure.

The method according to the present disclosure may be implemented in the form of software, and the encoding apparatus and/or decoding apparatus according to the present disclosure may be included in an apparatus that performs image processing, such as TV, a computer, a smartphone, a set-top box, and a display apparatus.

When the embodiments of the present disclosure are implemented by software, the aforementioned method may be implemented by a module (process or function) which performs the aforementioned function. The module may be stored in a memory and executed by a processor. The memory may be installed inside or outside the processor and may be connected to the processor via various well-known means. The processor may include Application-Specific Integrated Circuit (ASIC), other chipsets, a logical circuit, and/or a data processing device. The memory may include a Read-Only Memory (ROM), a Random Access Memory (RAM), a flash memory, a memory card, a storage medium, and/or other storage device. In other words, the embodiments according to the present disclosure may be implemented and executed on a processor, a micro-processor, a controller, or a chip. For example, functional units illustrated in the respective figures may be implemented and executed on a computer, a processor, a microprocessor, a controller, or a chip. In this case, information on implementation (for example, information on instructions) or algorithms may be stored in a digital storage medium.

In addition, the decoding apparatus and the encoding apparatus to which the present disclosure is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, a camcorder, a video on demand (VoD) service provider, an Over The Top (OTT) video device, an internet streaming service provider, a 3D video device, a Virtual Reality (VR) device, an Augment Reality (AR) device, an image telephone video device, a vehicle terminal (for example, a vehicle (including an autonomous vehicle) terminal, an airplane terminal, or a ship terminal), and a medical video device; and may be used to process an image signal or data. For example, the OTT video device may include a game console, a Blu-ray player, an Internet-connected TV, a home theater system, a smartphone, a tablet PC, and a Digital Video Recorder (DVR).

In addition, the processing method to which the embodiment(s) of the present disclosure is applied may be produced in the form of a program executed by a computer and may be stored in a computer-readable recording medium. Multimedia data having a data structure according to the embodiment(s) of the present disclosure may also be stored in a computer-readable recording medium. The computer-readable recording medium includes all types of storage devices and distributed storage devices in which computer-readable data is stored. The computer-readable recording medium may include, for example, a Blu-ray disc (BD), a universal serial bus (USB), a ROM, a PROM, an EPROM, an EEPROM, a RAM, a CD-ROM, a magnetic tape, a floppy disk, and an optical data storage device. In addition, the computer-readable recording medium includes media implemented in the form of a carrier wave (e.g., transmission through the Internet). In addition, a bitstream generated by the encoding method may be stored in a computer-readable recording medium or transmitted through a wired/wireless communication network.

Furthermore, the embodiment(s) of the present disclosure may be implemented as a computer program product by program code, and the program code may be executed in a computer according to the embodiment(s) of the present disclosure. The program code may be stored on a carrier readable by a computer.

Figure 14:
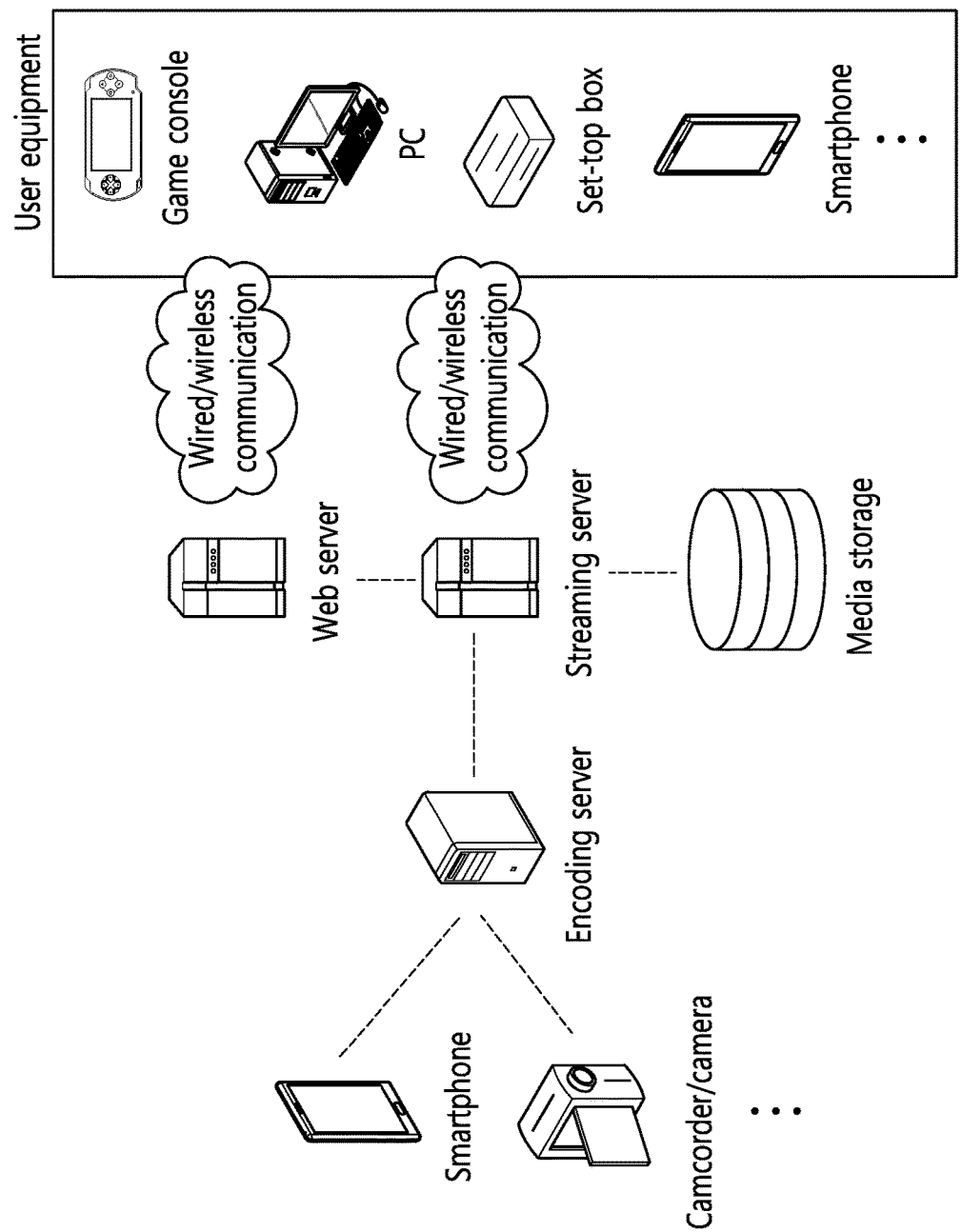
FIG. 14 shows an example of a content streaming system to which embodiments disclosed in the present disclosure may be applied.

FIG. 14 shows an example of a content streaming system to which embodiments disclosed in the present disclosure are applicable.

Referring to FIG. 14, the content streaming system applied to the embodiments of the present disclosure may include an encoding server, a streaming server, a web server, a media storage, user equipment, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the embodiments of the present document are applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in a distributed manner.

The claims described in the present disclosure may be combined in various ways. For example, the technical features of the method claim of the present disclosure may be combined and implemented as an apparatus, and the technical features of the apparatus claim of the present disclosure may be combined and implemented as a method. In addition, the technical features of the method claim and the technical features of the apparatus claim of the present disclosure may be combined and implemented as an apparatus, and the technical features of the method claim and the technical features of the apparatus claim of the present disclosure may be combined and implemented as a method.

What is claimed is:

1. An image decoding method performed by a decoding apparatus, the image decoding method comprising:
obtaining image information including information on a quantized escape value in a palette mode and information on a quantization parameter from a bitstream;
deriving an escape value for a current block based on the information on the quantized escape value and the information on the quantization parameter; and
generating a reconstructed sample of the current block based on the escape value,
wherein the information on the quantized escape value is obtained based on a binarization process,
the binarization process is performed based on a maximum value of the information on the quantized escape value, and
the maximum value is derived based on a quantization parameter derived from the information on the quantization parameter,
wherein the binarization process includes performing a truncated binary (TB) binarization on the information on the quantized escape value based on the maximum value,
wherein the information on the quantized escape value has symbol values from 0 to the maximum value,
in the TB binarization on the information on the quantized escape value, first u symbols are indicated based on k bits and remaining cMax−u+1 symbols are indicated based on (k+1) bits,
the cMax indicates the maximum value,
the k indicates an integer satisfying $2^k \leq cMax < 2^{k+1}$, and
the u is derived based on $2^{k+1}-(cMax+1)$.

2. The image decoding method of claim 1, wherein,
in the TB binarization, the maximum value is derived based on Clip(0,(1<<bitDepth) 1, (quantScale[qRem]*maxValue+(1<<(qBits−1)))>>qBits, bitDepth is a bit depth, quantScale is an array including k scale values, maxValue is derived based on (1<<bitDepth) −1, qRem is derived based on QP % 6, qBits is derived based on 14+(QP/6), and QP is the quantization parameter.

3. The image decoding method of claim 1, wherein the binarization process includes performing fixed length binarization on information on the quantized escape value.

4. The image decoding method of claim 3, wherein,
in the fixed length binarization, the maximum value is derived based on Clip(0, (1<<bitDepth)−1, (1<<binLength)−1),
bitDepth is a bit depth,
binLength is derived based on bitDepth−(Max(0,QP−5)/6), and
QP is the quantization parameter.

5. The image decoding method of claim 1, wherein the binarization process includes performing k-th order Exp-Golomb (EG) binarization on the information on the quantized escape information.

6. The image decoding method of claim 5, wherein,
in the k-th order EG binarization, the k-th order is determined variably based on the maximum value.

7. The image decoding method of claim 1, wherein the information on the quantized escape value is a syntax element for a quantized escape value of an escape-coded sample in the current block.

8. The image decoding method of claim 1, wherein the information on the quantization parameter is a syntax element for a minimum quantization parameter for a transform skip mode.

9. An image encoding method performed by an encoding apparatus, the image encoding method comprising:
deriving an escape value in a palette mode for a current block;
deriving a quantized escape value based on the escape value and a quantization parameter; and
encoding image information including information on the quantized escape value, wherein the information on the quantized escape value is encoded based on a binarization process, the binarization process is performed based on a maximum value of the information on the quantized escape value, and the maximum value is derived based on the quantization parameter, wherein the binarization process includes performing a truncated binary (TB) binarization on the information on the quantized escape value based on the maximum value, wherein the information on the quantized escape value has symbol values from 0 to the maximum value, in the TB binarization on the information on the quantized escape value, first u symbols are indicated based on k bits and remaining cMax−u+1 symbols are indicated based on (k+1) bits, the cMax indicates the maximum value, the k indicates an integer satisfying $2^k \leq cMax < 2^{k+1}$, and the u is derived based on $2^{k+1}-(cMax+1)$.

10. The image encoding method of claim 9, wherein the binarization process includes performing fixed length binarization on information on the quantized escape value.

11. The image encoding method of claim 9, wherein the binarization process includes performing k-th order Exp-Golomb (EG) binarization on the information on the quantized escape information.

12. The image encoding method of claim 11, wherein, in the k-th order EG binarization, the k-th order is determined variably based on the maximum value.

13. The image encoding method of claim 9, wherein the information on the quantized escape value is a syntax element for a quantized escape value of an escape-coded sample in the current block.

14. The image encoding method of claim 9, wherein the information on the quantization parameter is a syntax element for a minimum quantization parameter for a transform skip mode.

15. A non-transitory computer-readable storage medium storing an image encoding method generating a bitstream, wherein the image encoding method comprising:

deriving an escape value in a palette mode for a current block;

deriving a quantized escape value based on the escape value and a quantization parameter; and encoding image information including information on the quantized escape value, wherein the information on the quantized escape value is encoded based on a binarization process, the binarization process is performed based on a maximum value of the information on the quantized escape value, and the maximum value is derived based on the quantization parameter, wherein the binarization process includes performing a truncated binary (TB) binarization on the information on the quantized escape value based on the maximum value, wherein the information on the quantized escape value has symbol values from 0 to the maximum value, in the TB binarization on the information on the quantized escape value, first u symbols are indicated based on k bits and remaining cMax−u+1 symbols are indicated based on (k+1) bits, the cMax indicates the maximum value, the k indicates an integer satisfying $2^k \leq cMax < 2^{k+1}$, and the u is derived based on $2^{k+1}-(cMax+1)$.

* * * * *